United States Patent
Klose et al.

(10) Patent No.: US 7,679,152 B2
(45) Date of Patent: Mar. 16, 2010

(54) MICROMECHANICAL DEVICE, MICROMECHANICAL SYSTEM, APPARATUS FOR ADJUSTING SENSITIVITY OF A MICROMECHANICAL DEVICE, METHOD FOR PRODUCING A MICROMECHANICAL DEVICE

(75) Inventors: Thomas Klose, Dresden (DE); Thomas Graβhoff, Dresden (DE)

(73) Assignee: Fraunhofer-Gesellschaft zur Foerderung der andewandten Forschung e.V., Munich (DE)

( * ) Notice: Subject to any disclaimer, the term of this patent is extended or adjusted under 35 U.S.C. 154(b) by 0 days.

(21) Appl. No.: 12/106,417

(22) Filed: Apr. 21, 2008

(65) Prior Publication Data
US 2008/0278785 A1 Nov. 13, 2008

(30) Foreign Application Priority Data
May 10, 2007 (DE) .................. 10 2007 021 920

(51) Int. Cl.
*H01L 29/78* (2006.01)
*H01L 21/00* (2006.01)
*G02B 26/08* (2006.01)
(52) U.S. Cl. ................. 257/415; 438/48; 359/213.1
(58) Field of Classification Search ................. 257/415, 257/414, E21.001; 438/48, 50, 622; 359/213, 359/237, 213.1; 267/273; 333/186, 219; 310/309; 335/78; 381/174; 73/504.12
See application file for complete search history.

(56) References Cited
U.S. PATENT DOCUMENTS

| 4,699,006 A | 10/1987 | Boxenhorn |
| 5,016,072 A | 5/1991 | Greiff |
| 5,144,184 A | 9/1992 | Greiff |
| 5,605,598 A | 2/1997 | Greiff |
| 6,136,630 A * | 10/2000 | Weigold et al. ............... 438/50 |
| 6,256,131 B1 | 7/2001 | Wine et al. |

(Continued)

FOREIGN PATENT DOCUMENTS

DE    10 2007 001 516    4/2008

(Continued)

OTHER PUBLICATIONS

Official communication issued in counterpart German Application No. 10 2007 021 920.4, mailed on Apr. 1, 2009.

(Continued)

*Primary Examiner*—Thomas L Dickey
*Assistant Examiner*—Nikolay Yushin
(74) *Attorney, Agent, or Firm*—Keating & Bennett, LLP

(57) ABSTRACT

A micromechanical device has a layer; at least a first slot formed in the layer to define a first oscillation element oscillatably suspended via a first spring portion of the layer; and at least a second slot formed in the layer to define a second oscillation element oscillatably suspended via a second spring portion of the layer, wherein a trench is formed in the spring portion pair in a main surface of the layer, wherein a resonance frequency of the first oscillation element is different from that of the second oscillation element, and the first and second spring portions and the trench are formed such that, in an anisotropic lateral material removal and/or addition of the first and second spring portions, a ratio of a relative change of the resonance frequency of the second oscillation element to that of the first oscillation element ranges from 0.8 to 1.2.

24 Claims, 10 Drawing Sheets

U.S. PATENT DOCUMENTS

| | | |
|---|---|---|
| 6,285,489 B1 | 9/2001 | Helsel et al. |
| 6,331,909 B1 | 12/2001 | Dunfield |
| 2004/0183149 A1* | 9/2004 | Schenk ..................... 257/415 |

FOREIGN PATENT DOCUMENTS

| | | |
|---|---|---|
| WO | 2004/092745 A3 | 8/2007 |

OTHER PUBLICATIONS

Enderling et al.: "Characterization of Frequency Tuning Using Focused Ion Beam Platinum Deposition," Journal of Micromechanics and Microengineering; vol. 17; 2007; pp. 213-219.

"Ein Neuartiger Mikroaktor Zur Ein-Und Zweidimensionalen Ablenkung von Licht," von Schenk; Gerhard-Mercator-Universitat-Gesamthochshule-Duisburg; Dec. 17, 2000; 144 pages.

* cited by examiner

MICROMECHANICAL DEVICE, MICROMECHANICAL SYSTEM, APPARATUS FOR ADJUSTING SENSITIVITY OF A MICROMECHANICAL DEVICE, METHOD FOR PRODUCING A MICROMECHANICAL DEVICE

CROSS-REFERENCE TO RELATED APPLICATIONS

This application claims priority from German Patent Application No. 10 2007 021 920.4, which was filed on May 10, 2007, and is incorporated herein in its entirety by reference.

TECHNICAL FIELD

The invention relates to micromechanical devices having an oscillation element and a spring portion, and for example to the adjustment of the sensitivity of the spring hardness to fabrication variations.

BACKGROUND

Micromechanical devices with oscillatably suspended oscillation elements may be employed both as micromechanical sensors and as micromechanical actuators. The micromechanical device consisting of the spring portion and the oscillatably suspended oscillation element has an eigenfrequency or resonance frequency. In many applications, the resonance frequency of the micromechanical device is to correspond to a fixedly default frequency, in order to achieve, using the resonance increase, for example sufficient sensitivity in the case of a sensor and for example sufficient oscillation amplitude in the case of an actuator. Examples for micromechanical structures e.g. are those serving as clock transmitters in e.g. clocks, or deflecting elements such as scanner mirrors, which are used for data projection, wherein the data frequency and the oscillation frequency is to be in an fixedly default ratio. So as to keep the power needed for the oscillation generation low, such devices generally possess relatively high quality, with the result that the resonance curve is narrow and there is only very little margin in the excitation frequency when maintaining the desired oscillation amplitude.

In MEMS (micro electro mechanical systems) scanner mirrors, even slight variations of the width of the torsion springs significantly change the resonance frequencies. Fabrication variations of the spring width may be due to the etching process or the photolithographic resist mask. Depending on the spring geometry to be fabricated, these variations have some influence on the spring hardness, and hence on the oscillation frequency of the device. For example, this is especially critical in devices for two-dimensional deflection of light, such as the MEMS scanner mirrors, since here often a certain fixed ratio of the oscillation frequencies is needed. An MEMS scanner, for example, is described in the doctoral thesis "Ein neuartiger Mikroaktor zur ein-und zweidimensionalen Ablenkung von Licht" by Schenk, Gerhard-Mercator-Gesamthochschule Duisburg, 2000.

Above all, the systematic deviations of the spring dimensions have great influence on the frequency ratio of such a micromechanical oscillator. It is strongly influenced by variations of the fabrication process. Usually, movable parts are defined with the aid of etching processes in the Microsystems technology. Here, the properties of the masks and the etching processes employed have an influence on the types and order of magnitude of the variations. It is distinguished between global, local and direction-dependent variations.

Global variations influence the geometries of all devices fabricated in a step. One example for a global variation is the time-dependent variation of the pressure in the etching gas.

Local variations influence the dimensions of the fabricated geometries in location-dependent manner. The location-dependent variation of the concentration of the etching gas in the process chamber is one example for a local variation.

Direction-dependent variations influence the dimension of the fabricated geometry depending on its orientation in the process chamber or with respect to the chamber center.

On the left-hand side, FIG. 4 shows a greatly simplified illustration of a micromechanical oscillator 400 with an oscillating body 410 and the springs 420 and 422. It can be seen that both the geometry of the springs 420, 422 and the geometry of the oscillating body 410 are defined by so-called open trenches 440. On the right-hand side, FIG. 4 shows the detail of the spring 420 with an etched trench 440 on both sides of the spring 420. These open trenches are produced by a dry etching process, for example. Such a process is characterized in that fabrication variations mainly occur in the trench width and in the vertical profile of the trench. Shifts of the trenches with respect to each other are negligible. Both deviations of the spring geometry and deviations of the geometry of the oscillating body result from the variations of the trench geometry.

For the correction of the resonance frequency, and hence the frequency ratio, there are various approaches. In one implementation, the ambient pressure, and hence the effective mass, of the moved element is altered by application of gas (U.S. Pat. Nos. 6,331,909, 6,285,489). The apparatus needed for this and the regulating circuit, however, are relatively intensive. In the same patent specification, there is presented a second method, in which the spring is covered with a gas-absorbing material. Upon absorption, the material properties of the spring change, and hence the frequency. The outlay for this method also seems relatively high. Moreover, it is to be assumed that the quality of the system is diminished by the use of an absorbing material for the springs.

In another implementation (U.S. Pat. Nos. 6,256,131, 6,285,489), in torsion oscillators, part of the rotating mass may be shifted toward or away from the torsion axis by means of electrostatic forces. Thereby, the moment of inertia, and hence again the resonance frequency, changes. Regulation of the resonance frequency may indeed be done thereby, but greater variations cannot be corrected due to the generally small translation paths of the moveable mass.

Since the regulation range of the resonance frequency in micromechanical devices generally is small as compared with fabrication variations, sorting substantially takes place such that devices with too large a deviation cannot be used. Thus, the yield is reduced significantly.

With the aid of geometrical structures, which are broken by external influence in targeted manner, the effective length, and hence the stiffness, of micromechanical spring elements can be influenced.

This solution was already filed by the Fraunhofer Institute for Photonic Microsystems in the patent application with the international publication number WO 2004/092745 A1.

Through the equipment of the oscillating body with additional structures, so-called compensation trenches, the mass or mass moment of inertia of the oscillator may be influenced, so that fabrication-induced deviation of the spring geometry can be compensated for at least partially. This solution was filed with the German Patent and Trademark Office by the Fraunhofer Institute for Photonic Microsystems under the application number 102007001516.1-54.

With the aid of a spring elements that can be influenced in their geometry, the spring hardness, and hence the resonance frequency, can be adjusted within certain boundaries. This solution was filed with the German Patent and Trademark Office by the Fraunhofer Institute for Photonic Microsystems under the application number 102007001516.1.

An efficient way for targeted adjustment or tuning of the sensitivity of the spring hardness to fabrication variations in such micromechanical devices therefore is desirable.

SUMMARY

According to an embodiment, a micromechanical device may have: a layer; at least a first slot formed in the layer to define a first oscillation element oscillatably suspended via a first spring portion of the layer; and at least a second slot formed in the layer to define a second oscillation element oscillatably suspended via a second spring portion of the layer, wherein a trench is formed in the spring portion pair in a main surface of the layer, wherein a resonance frequency of the first oscillation element is different from a resonance frequency of the second oscillation element, and the first spring portion, the second spring portion and the trench are formed such that, in an anisotropic lateral material removal and/or an anisotropic lateral material addition of the first spring portion and the second spring portion, a ratio of a relative change of the resonance frequency of the second oscillation element to a relative change of the resonance frequency of the first oscillation element ranges from 0.8 to 1.2.

According to another embodiment, a micromechanical device may have: a layer, in which at least two outer slots are formed to define a first oscillation system with an oscillating frame oscillatably suspended via a first outer spring portion and a second outer spring portion of the layer, and wherein at least two inner slots are formed in the layer within the oscillating frame, in order to define a second oscillation system with an oscillation element oscillatably suspended via two inner spring portions of the layer, wherein a resonance frequency of the first oscillation system is different from a resonance frequency of the second oscillation system, wherein a trench each is formed in a main surface of the layer in a pair of the spring portions, and wherein the inner spring portions, the outer spring portions and the trenches are formed such that, in an anisotropic lateral material removal and/or an anisotropic lateral material addition of the inner spring portions and the outer spring portions, a ratio of a relative change of the resonance frequency of the second oscillation system to a relative change of the resonance frequency of the first oscillation system ranges from 0.8 to 1.2.

According to another embodiment, a micromechanical system may have: a first micromechanical device having a layer in which at least one slot is formed to define an oscillation element oscillatably suspended via a spring portion of the layer; and a second micromechanical device having a layer in which at least a second slot is formed to define a second oscillation element oscillatably suspended via a second spring portion of the layer, wherein a trench is formed in a main surface of the layer in the second spring portion; wherein a resonance frequency of the first oscillation element is different from a resonance frequency of the second oscillation element, and the first spring portion, the second spring portion and the trench are formed such that, in an anisotropic lateral material removal and/or an anisotropic lateral material addition of the first spring portion and the second spring portion, a ratio of a relative change of the resonance frequency of the second oscillation element to a relative change of the resonance frequency of the first oscillation element ranges from 0.8 to 1.2.

According to another embodiment, an apparatus for designing a micromechanical device with adapted sensitivity may have: a receiver for receiving design data of the micromechanical device; a definer for defining a sensitivity of a spring portion of the micromechanical device with respect to fabrication variations; and a determinator for determining a structure and arrangement of a trench, which is formed in the production of the micromechanical device of a layer in the spring portion of the micromechanical device in a main surface of the layer, in order to achieve the defined sensitivity of the spring portion.

According to another embodiment, a method for producing a micromechanical device may have the steps of: providing a layer; producing at least a first slot in the layer to define an oscillation element oscillatably suspended via a spring portion of the layer; and producing at least a second slot in the layer to define an oscillation element oscillatably suspended via a spring portion of the layer; and forming a trench in the second spring portion in a main surface of the layer, wherein a resonance frequency of the first oscillation element is different from a resonance frequency of the second oscillation element, and the first spring portion, the second spring portion and the trench are formed such that, in an anisotropic lateral material removal and/or an anisotropic lateral material addition of the first spring portion and the second spring portion, a ratio of a relative change of the resonance frequency of the second oscillation element to a relative change of the resonance frequency of the first oscillation element ranges from 0.8 to 1.2.

According to another embodiment, a micromechanical device may have a layer in which at least one slot is formed to define an oscillation element oscillatably suspended via a spring portion of the layer, wherein a trench in form of a depression is formed in the spring portion in a main surface of the layer.

According to another embodiment, a micromechanical device may have a layer in which at least one slot is formed to define an oscillation element oscillatably suspended via spring portion of the layer, wherein a trench is formed in the spring portion in a main surface of the layer, wherein the trench is shorter than a length of the spring portion.

Embodiments of the present invention further provide an apparatus for reducing deviations of the frequency ratios in micromechanical devices or micromechanical systems with at least two resonantly used degrees of freedom.

What is meant by the term deviation of the frequency or the frequency ratio in the following, is the mismatch of the utilized eigenfrequencies or the frequency ratio of devices of basically the same construction, which occurs in spite of identical and constant environmental conditions. The reason for this lies in variations of frequency-determining material parameters (elastic constants, density, . . . ) and statistical or systematical deviations of the dimensions of spring and mass or gaps acting in dampening manner, due to tolerances in adjustment, structuring and layer generation.

BRIEF DESCRIPTION OF THE DRAWINGS

Embodiments of the present invention will be detailed subsequently referring to the appended drawings, in which.

DETAILED DESCRIPTION

Figure 1A:
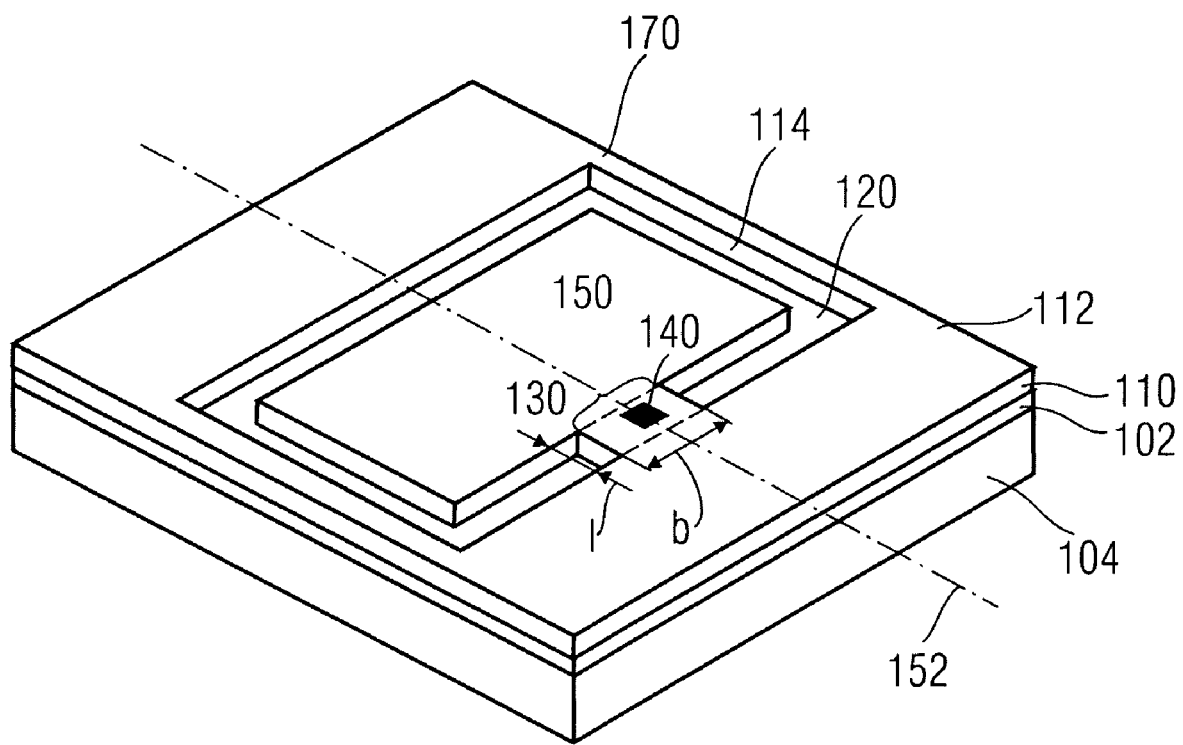
FIG. 1A shows an embodiment of a micromechanical device with an oscillation element oscillatably suspended via a spring portion.

Before the present invention will be explained in greater detail in the following on the basis of the accompanying drawings, it is pointed out that the drawings are not to scale for better comprehensibility. Moreover, the same reference numerals are used for objects and functional units having the same or similar functional properties, with repeated description of these objects and functional units being omitted. In this context, it is further pointed out that on the one hand, unless explicitly indicated otherwise, sections referring to objects with similar or the same functional properties are interchangeable among the descriptions of the various embodiments. On the other hand, it is pointed out that by common use of a reference numeral of an object occurring in more than one embodiment it is not shown that these have identical features and properties in the various embodiments or the embodiment concerned. Common or similar reference numerals hence do not represent any indication regarding the concrete design and dimensioning.

FIG. 1A shows an embodiment of a micromechanical device 100 with a layer 110 in which at least one slot 120 is formed to define an oscillatably suspended oscillation element 150 via a spring portion 130 (see dot-dash line) of the layer 110, wherein a trench 140 is formed in the spring portion 130 in a main surface 112 of the layer 110. The spring portion 130 has a width b and a length l.

Thus, FIG. 1A shows an embodiment of a flexion spring, for example.

Such micromechanical devices are typically formed of a layer 110, e.g. a semiconductor layer 110, by structuring the layer by at least one open trench 120, also referred to as slot 120 in the following, such that at least one oscillation element 150 and a spring portion 130 are defined.

As already set forth before, this slot 120 is often produced by etching. Below the layer 110, for example, a buried insulation layer 102 may be arranged, and a substrate 104 thereunder. In the production of the slot 120, and hence the definition of the spring portion 130, of the oscillation element 150 and the frame 170 in the layer 110, for example, a suitable etching method was used, in which the buried insulation layer 102 served as an etch stop. All structures, that is spring portion 130, oscillation element 150 and frame 170, therefore have the same thickness, namely the thickness of the layer 110.

The shape and/or base area of the oscillation body or oscillation element 150 here are arbitrary, i.e. may be e.g. rectangular, round or ellipsoidal.

In FIG. 1A, the oscillation element 150, which for example serves as a mirror, is formed as a rectangular plate. The spring portion 130 here is formed as an elongated strip resting on the center of one side of the oscillation element 150. In other words, the spring portion 130 is arranged centrally and/or symmetrically to a center axis 152 of the oscillation element (see dot-dash line). On the other side, the spring portion 130 ends at the frame 170. In this manner, the oscillation element 150 is oscillatably suspended via the spring portion 130. Here, the spring portion 130 defines a rest position, in which the oscillation element 150 is in the plane of the layer 110. Upon deflection of the oscillation element 150 from the rest position, the spring portion 130 effects a restoring force and/or a torque backward to the rest position.

In FIG. 1A, the entire construction is supported by the substrate 104, which is below the buried insulation layer 102 and may for example also be formed of a semiconductor, such as silicon. The substrate 104, the insulation layer 102 and the semiconductor layer 110 may for example be prepared as SOI (silicon on insulator) wafer prior to the production, so as to concurrently form a plurality of micromechanical devices 100 therein, which are diced thereafter. So as to allow for deflection of the oscillation element 150 from its rest position at all, the insulation layer 102 and the substrate 104 are removed below the oscillation element 150 and the spring portion 130, to form a cavity thereunder. Here, the substrate 104 may be removed completely or only partially below the oscillation element 150 and the spring portion 130, so as to allow for the oscillation. The structures formed in the layer 110 thus will only rest on the non-removed remainder of the buried insulation layer 102 only at the outer edge 170 of the layer 110.

For producing the cavity, for example, the substrate 104 and the buried insulation layer 102 were removed except for edge areas of the layer 110 by suitable etching steps after the structuring of the layer 110. The oscillation element 150 thus is unsupported except for the spring portion 130.

Alternative methods for structuring the layer 110 and/or for forming the slots 120 e.g. also are punching, in which the slots 120 are punched out.

Furthermore, in alternative embodiments, the layer 110 may be produced without insulation layer 102 or substrate 104, and for example only be fixed temporally for the production, storage and transportation on a carrier material, in order to then be arranged freely and oscillatably upon its assembly onto another frame.

Furthermore, the micromechanical device may only consist of a spring portion 110 and the oscillation element 150, if the later assembly of the micromechanical device guarantees corresponding fixing thereof to the oscillatable portion.

Furthermore, the frame 170 may enclose the spring portion and the oscillation element, as this is illustrated in FIG. 1A, or also only partially enclose or for example be formed only on the side of the spring portion 130.

Furthermore, in alternative embodiments, the spring portion 130 may be arranged on the longer side of the oscillation element 150 or on the shorter side of the oscillation element 150 and may have various widths depending on the desired spring hardness.

As explained before, a trench 140 is formed in the spring portion 130 in the main surface 112 of the layer 110. Here, the main surface 112 is the "upper" planar surface produced by the layer generation. On the bottom side of the layer 110, i.e. arranged opposite to the main surface 112, there correspondingly is a second main surface, which forms the "lower" main surface of the layer 110 in the spatial illustration and, for example, is adjacent to the buried insulation layer 102. From these main surfaces, the further "surfaces" in the slots 120 of the layer 110 are to be distinguished, which were for example produced by the etching. These will be referred to as minor or slot surfaces 114 of the layer 110 in the following.

Embodiments of the micromechanical devices comprise at least one trench 140 in the spring portion 130 so as to influence the sensitivity of micromechanical spring elements or spring portions 130 to fabrication variations with the aid of this additional structuring within the spring geometry.

Figure 1B:
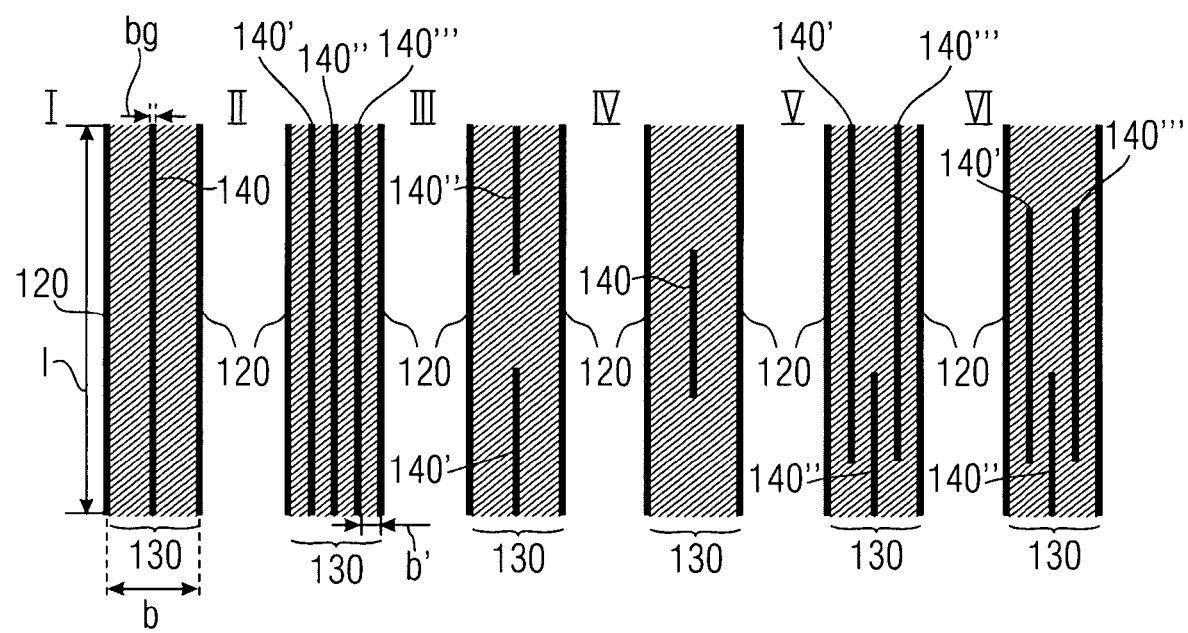
FIG. 1B shows embodiments of a spring portion with various trenches or trench structures.

FIG. 1B shows six different embodiments I-VI of a spring portion 130 with various trench structures.

Here, embodiment I shows a spring portion 130 that is defined by the slot 120 on the outer edges and comprises a trench 140 at the center along the longitudinal axis, which is formed across the entire length of the spring portion 130. The spring portion 130 has a width b and a length l, the trench 140 a width bg. The spring portion may for example rest on the oscillation element 150 at the upper longitudinal-side end and on the frame 170 at the lower longitudinal-side end.

The embodiment II in FIG. 1B shows a spring portion 130, a trench structure with three parallel, equidistantly arranged trenches 140', 140" and 140''', which are formed across the entire length of the spring portion 130.

Embodiment III in FIG. 1B shows a spring portion 130 having two trenches 140' and 140" arranged behind each other, which are both arranged on the longitudinal center axis of the spring portion 130 and are symmetrical with respect to the transversal central axis (not drawn) of the spring portion 130.

Embodiment IV in FIG. 1B shows a spring portion 130 with a trench 140 that is arranged along the longitudinal central axis of the spring portion 130, but does not extend along the entire spring portion 130, contrary to I, and is arranged axis-symmetrically to a transversal central axis of the spring portion 130.

Embodiment V shows a spring portion 130 having three trenches 140', 140" and 140''', wherein the trenches 140' and 140''' are arranged in parallel in staggered manner as opposed to the trench 140", all three of them do not extend across the entire length of the spring portion 130, but only across a part of the spring portion 130, the trench 140" is arranged on the longitudinal central axis of the spring portion, the trenches 140' and 140''' are arranged axis-symmetrically to the longitudinal central axis of the spring portion 130, the trench 140" extends up to a longitudinal-side end of the spring portion 130, and the trenches 140' and 140''' extend up to the opposite longitudinal-side end of the spring portion 130.

Embodiment VI of FIG. 1B shows a spring portion 130, similar to the embodiment V, wherein, in contrast thereto, the trenches 140' and 140''' do not extend up to an end of the spring portion 130.

Here, a width b' may be associated with the partial areas of the spring portion 130 defined by the trenches 140, 140', 140", 140''', as this is illustrated exemplarily and in place of the other embodiments in the embodiment II in FIG. 1B. The partial areas may also be referred to as ridges. The overall width b of the spring portion 130 thus results from the widths b' of the parts of the spring portions or the ridges of the spring portions and the trench widths bg. The parts or ridges of the spring portions may here have the same or different widths b', and the trenches may also have the same or different widths bg. Here, the widths bg of a trench 140 or of the trenches 140', 140" and 140''' may be smaller or substantially smaller than the widths b' of a part of the spring portion, but also equal to the width b' or even greater than the width b' of the parts or ridges of the spring portion 130 in alternative embodiments.

The change in the sensitivity of the spring hardness of a spring portion to fabrication variations is the greater, the greater the number of the trenches, the longer each individual trench and/or the deeper each individual trench is.

FIG. 1B with the embodiments I-VI thus shows various possible implementations for spring elements or spring portions with additional structurings or trenches for adjusting the sensitivity to fabrication variations. Implementations of the trenches, however, are not limited to the once shown in FIG. 1B.

Here, the structuring may consist of a trench 140, which is straight, is curved or is formed to be meander-shaped, extends across the entire length of the spring portion or only across parts of the length of the spring portion, is on the longitudinal central axis of the spring portion 130 or at another location of the spring portion 130.

Furthermore, spring portions 130 may comprise several trenches or a multiplicity of trenches 140'-140''', which may be formed and/or arranged on the spring portion 130 similarly or differently, i.e. e.g. straight, curved, meander-shaped, parallel, behind each other, arranged in parallel in offset manner, extend from a longitudinal end to the opposite other longitudinal end or only across part of the spring portion or only across part of the length of the spring portion 130. Furthermore, the trenches may be arranged multiply in parallel or multiply behind each other, or the trench structures may have arbitrary combinations of the above-mentioned structures.

Here, the structures may comprise one, two, three or more trenches.

Furthermore, a trench may comprise various trench depths or even be continuous, i.e. reach from the first main surface to the second main surface arranged opposite to the first one, or be a slot like the slot 120 for structuring. If the trench is not continuous from the main surface to the opposite surface, it is also referred to as a depression. In the case of several trenches, all or part of the trenches may have the same trench depths or different trench depths or be formed to be partially continuous or all continuous.

Generally, it may be stated that various shapes, positions, lengths and depths or continuities and numbers of the additional structurings or trenches of the spring elements or spring portions may be utilized for adjustment of the sensitivity to fabrication variations and also compensation for the deviations of the frequency ratio, as will be set forth later. The possibilities resulting therefrom are summarized in the following generally by the term trench structure or structuring. Here, the trench structures may be chosen depending on the process variations (global, local, direction-dependent).

The structuring by one or a multiplicity of trenches 140'-140''' may be done both in flexion springs, as is illustrated in FIG. 1A, and for example in torsion springs or in spring structures loaded with tension.

For better comprehensibility, the term trench or trench structure or structure will generally be used with the reference numeral 140, independently of the fact whether the trench structure consists of a single trench 140 or several trenches, e.g. 140'-140'''.

Figure 1C:
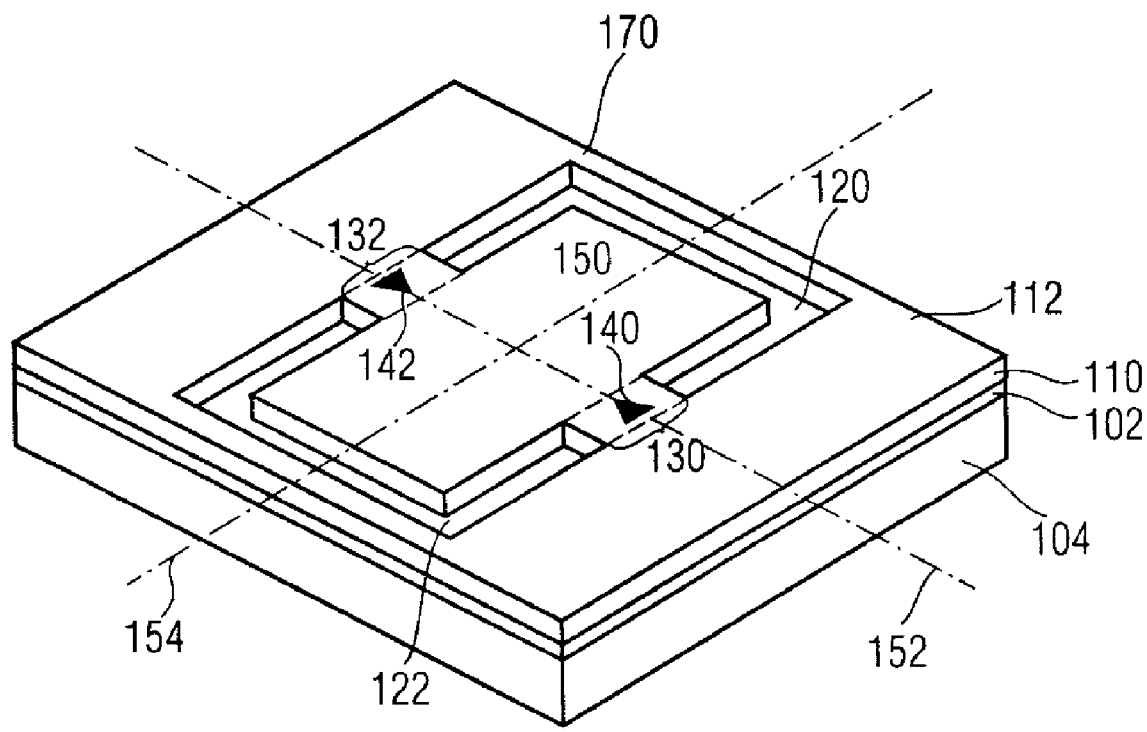
FIG. 1C shows an embodiment of a micromechanical device with an oscillation element oscillatably suspended via two oppositely arranged spring portions.

FIG. 1C shows an embodiment of a micromechanical device formed as a torsion oscillator. The micromechanical device 1100 comprises a layer 110 in which a first slot 120 and a second slot 122 are formed, to define a first spring portion 130 (see dashed line) and a second spring portion 132 (see dashed line) of the layer 110, via which an oscillation element 150 is oscillatably suspended. Here, the first spring portion 130 and the second spring portion 132 each comprise a trench or trench structure 140 and 142, respectively, of maybe several trenches. The first spring portion 130 and the second spring portion 132 each are arranged at the center on respective opposite sides of the oscillation element 150. In other words, the first spring portion 130 and the second spring portion 132 are arranged centrally with respect to a central axis 152 of the oscillation element 150 on opposite sides thereof. In this way, it becomes possible for the oscillation element 150 to pivot about a pivot axis passing through the spring portions 130, 132, which in this case form torsion springs 130, 132. The spring portions 130, 132 here define a rest position, in which the oscillation element 150 is in the plane of the layer 110. Upon deflection of the oscillation element 150 from the rest position, by tilting the oscillation element 150 about the pivot axis defined by the portion springs or spring portions 130, 132, the spring portions 130, 132 effect a restoring force or a torque back to the rest position.

As already explained on the basis of FIG. 1A, a cavity is formed below the oscillation element 150 and the spring portions 130, 132, to enable the oscillation.

So as to guarantee for uniform torsion on the two spring portions 130, 132, the spring portions 130, 132, usually are arranged symmetrically to a second central axis 154 of the oscillation element 150, which runs orthogonally to the first central axis 152. Correspondingly, in these cases of application, the trench structure 140 and the trench structure 142 are arranged symmetrically, as this is illustrated in symbolical manner by the triangular shape of the trench 140 of the first spring portion 130 and the triangular shape of the trench 142 of the second spring portion 132.

One embodiment, as illustrated in FIG. 1C, may for example be employed as a micromechanical mirror in microscanners, to deflect a modulated light beam at a predetermined target frequency, in order to move the light beam back and forth in an image field at the target frequency, wherein an image is formed on the image field by the modulated light beam moving on the image field.

It is pointed out, however, that embodiments of the present invention may also be used in other micromechanical devices with an oscillation element oscillatably suspended via a spring portion.

Figure 2A:
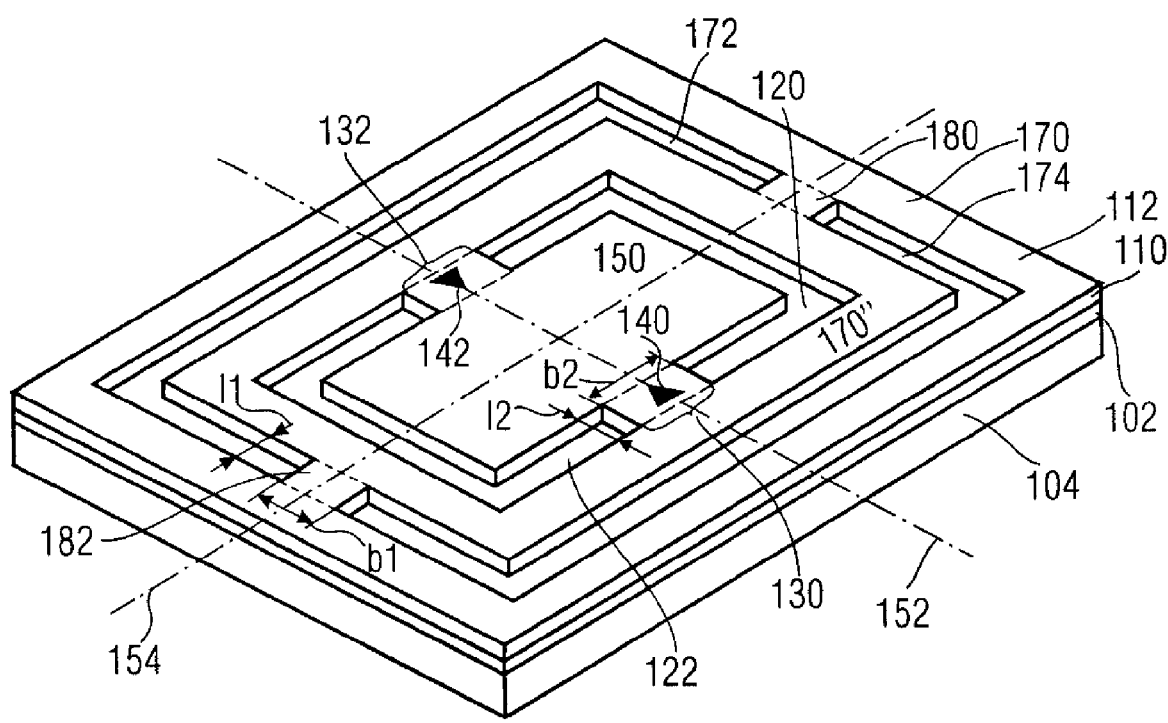
FIG. 2A shows a spatial illustration of an embodiment of a two-dimensional torsion oscillator as micromechanical device.

FIG. 2A shows an embodiment of a micromechanical device as a two-dimensional torsion oscillator, e.g. as a two-dimensional micromirror. Here, the micromechanical device 200 comprises a layer 110, in which at least a first outer slot 172 and a second outer slot 174 are formed, to define an oscillating frame 172" oscillatably suspended via a first outer spring portion 180 and a second outer spring portion 182 (see dashed lines). Wherein at least a first inner slot 120 and a second inner slot 122 are formed within the oscillating frame 172", to define an oscillation element oscillatably suspended via a first inner spring portion 130 and a second inner spring portion 132 of the layer 110. Here, the first inner spring portion 130 and the second inner spring portion 132 are arranged on a first central axis 152 of the oscillation element 150 in symmetrical manner, and the first outer spring portion 180 and the second outer spring portion 182 are arranged on a second central axis 154, which is arranged orthogonally with respect to the first central axis 152, symmetrically to the second central axis. The first inner spring portion 130 and the second inner spring portion 132 have a width $b_2$ and a length $l_2$ (only drawn in for the first inner spring portion 130), and the first outer spring portion 180 and the second outer spring portion 182 have a width $b_1$ and a length $l_1$ (only drawn in for the second outer spring portion 182).

For better readability, the indices are not subscripted in the figures, i.e. entered as b1 in the figures.

As already explained on the basis of the embodiments according to the FIGS. 1A and 1C, there is a cavity below the oscillation element 150, the inner oscillation portions 130, 132, the oscillating frame 170" and the outer spring portions 180, 182, to allow for the oscillation of the foregoing elements. The first inner spring portion 130 comprises a first trench structure 140, and the second inner spring portion 132 a second trench structure 142.

Here, in embodiments, the first trench structure 140 and the second trench structure 142 may be formed to be symmetrical to the second axis 154, in order to achieve a uniform change in sensitivity to fabrication variations on both sides.

In alternative embodiments, the trench structures may also or instead be arranged in the two outer spring portions 180, 182.

Micromechanical devices 200 in which the oscillation element 150 is formed as a mirror, for example, hence enable to deflect a modulated light beam in two directions, e.g. in a row and a column direction. Here, a first resonance frequency for a first dimension is defined by the outer spring portion pair 180, 182, and a second resonance frequency for a deflection in the second dimension is defined by the inner spring portion pair 130, 132. In other words, the two-dimensional torsion oscillator shown in FIG. 2A has two resonantly used degrees of freedom.

As already explained on the basis of FIGS. 1A and 1C, the sensitivity of micromechanical spring elements or spring portions to fabrication variations may be influenced with the aid of additional structurings or trench structures within the spring geometry. This is also referred to as "sensitivity tuning". In particular, devices with several resonantly used degrees of freedom, which indeed have great deviations of the resonance frequencies, but comparably small deviations of the frequency ratio, may be produced in this manner. One example for a micromechanical device with two resonantly used degrees of freedom is the micromechanical device shown in FIG. 2A.

The square of the resonance frequency or eigenfrequency f of a linear oscillator is directly proportional to the spring hardness:

$$f^2 = \frac{1}{4\pi^2}\frac{k}{m} \text{ or } f^2 = \frac{1}{4\pi^2}\frac{k}{J} \quad (1)$$

Here, m is the mass and J is the mass moment of inertia of the oscillating body, k the spring hardness.

In the following, the effect of the trenches or trench structures will be explained at the example of a torsion spring element, as is shown in FIG. 2A. The principle may, however, also be applied to other devices or other spring types, e.g. to flexion or tension springs.

The spring hardness of a rod-shaped, straight torsion spring, e.g. the spring portions 130, 132, 180 and 182, with a rectangular cross section is determined by the material properties and by the geometrical dimensions:

$$k = GI_t/L \text{ with } I_t \sim (b+\Delta b)^3 h \text{ for } h > b \quad (2)$$

Here, G is the modulus of rigidity, and $I_t$ is the torsion area moment; b is the width, h is the height or thickness, and L the length of the torsion spring, $\Delta b$ is the fabrication-induced deviation of the spring width. The sensitivity of the spring hardness to fabrication variations hence is the smaller, the greater the width of the torsion spring. Torsion spring elements of equal width have the same sensitivity in first approximation.

Using the above-mentioned formulae or relations, assuming a constant mean modulus of rigidity, a disproportionate connection between the structural width or spring portion width b and the eigenfrequency or resonance frequency f results:

$$f \sim \sqrt{k} \sim b^{3/2} \text{ or } \frac{f}{f+\Delta f} = \left(\frac{b}{b+\Delta b}\right)^{3/2} \text{ for } b < h \quad (3)$$

Here, $\Delta f$ and $\Delta b$ designate the deviation of the frequency and the deviation of the structural width, respectively. Hence:

$$\Delta f = \frac{f}{\Gamma}\left(1 + \frac{\Delta b}{b} - \Gamma\right) \text{ with } \Gamma = \sqrt{\frac{b}{b+\Delta b}} \quad (4)$$

For deviations $\Delta b$ that are small in relation to the structural width, this expression may be approximated well by the first-order term of its TAYLOR series development to $\Delta b$:

$$\Delta f \approx 3f\frac{\Delta b}{2b} \text{ for } \Delta b \ll b \quad (5)$$

With the aid of this connection, the order of magnitude of the process-induced deviation of the structural width can be determined. To this end, the resonance eigenfrequency of a sufficiently large number of devices of the same type was determined experimentally. From the resulting frequency deviations $\Delta f$, the accompanying deviations of the torsion spring width may be determined with the aid of the connection (5). Starting at a number of about 10,000 devices, the distribution of the deviations thus determined only changes slightly.

The distributions of the spring width resulting for more than 10,000 devices selected at random clearly imply a Gaussian course in good approximation. Accordingly, the process-induced deviation of the structural width may be regarded as normally distributed in good approximation.

So as to be able to quantize the properties of a certain design with respect to the sensitivity to fabrication tolerances, following the measurement technology, a sensitivity value $S_{66\,b}$ (sensitivity) is introduced:

$$S_{\Delta b} = \frac{\partial f}{\partial \Delta b} \quad (6)$$

For micro-scanner mirrors with straight torsion springs, when assuming small deviations as compared with the structural width, the following expression results with the aid of the approximation (5):

$$S_{\Delta b} \approx \frac{\Delta f}{\Delta b} \approx \frac{3f}{2b} \quad (7)$$

Here, it is to be noted that the sensitivities determined in this manner refer to the absolute values of the resonance eigenfrequencies. So as to compare designs with different frequencies with respect to the relative frequency deviations, a normalized sensitivity $S_{rel}$ is introduced:

$$S_{rel} = S_{\Delta b, rel} = \frac{S_{\Delta b}}{f} \approx \frac{3}{2b} \quad (8)$$

This normalized sensitivity Srel is also referred to as relative sensitivity. A relative or normalized frequency change $f_{rel}$ correspondingly is defined as the frequency change normalized to the resonance frequency:

$$\Delta f_{rel} = \frac{\Delta f}{f} \text{ and with} \quad (5)$$

$$\Delta f_{rel} \approx 3 \cdot \frac{\Delta b}{2b} \quad (9)$$

For micromechanical devices or systems in which the resonance frequency of a first spring portion or spring element is to be at a fixed, default ratio to the resonance frequency of a second spring portion or spring element, it therefore is desirable that the relative sensitivity of the spring portions with respect to the fabrication variations is equal, i.e. the following applies for an optimum design:

$$V_S = \frac{S_{rel2}}{S_{rel1}} = 1, \quad (10)$$

wherein $S_{rel1}$ is the relative sensitivity of the first spring portion, and $S_{rel2}$ is the relative sensitivity of the second spring portion, and $V_S$ is the ratio of the first relative sensitivity to the second relative sensitivity.

From the formula (10) and the formulae (8), (7) and (9), the following connection between the ratio of the relative sensitivities and the ratio of the relative frequency changes results:

$$\frac{S_{rel2}}{S_{rel1}} = \frac{\frac{S_2}{f_2}}{\frac{S_1}{f_1}} = \frac{\frac{\Delta f_2}{f_2}}{\frac{\Delta f_1}{f_1}} = \frac{\Delta f_{rel2}}{\Delta f_{rel1}} \quad (11)$$

Here, the quantities with the index 1 refer to the first spring portion or the first spring portion pair, and the quantities with the index 2 to the second spring portion or to the second spring portion pair. Correspondingly, Srel1 designates the relative sensitivity of the first spring portion and Srel2 the relative sensitivity of the second spring portion, S1 the absolute sensitivity, f1 the resonance frequency, $\Delta f1$ the absolute frequency change, and $\Delta frel1$ the relative frequency change of the first spring portion or a first spring portion pair, and S2 the absolute sensitivity, f2 the resonance frequency, $\Delta f2$ the absolute frequency change and $\Delta frel2$ the relative frequency change of the second spring portion or a second spring portion pair.

From the relationship (10) in connection with relationship (8) the following also results:

$$\frac{S_{rel2}}{S_{rel1}} = \frac{b_1}{b_2} \quad (12)$$

wherein b1 is the width of the first spring portion or spring portion pair, and b2 is width of the second spring portion or second spring portion pair.

With this, it becomes obvious, that the ratio of the relative sensitivities of two different spring portions or different spring portion pairs corresponds to the ratio of the relative frequency changes of the two spring portions or of the two spring portion pairs and corresponds to the inverse of the ratio of the spring portion widths of the two spring portions or two spring portion pairs.

The condition $V_S=1$ may for example be met if the width b1 of the first spring portion equals the width b2 of the second spring portion, i.e. if the following applies:

$$\frac{b_1}{b_2} = 1 \text{ or } b_1 = b_2 \tag{13}$$

If two different eigenfrequencies are used in one device (e.g. micro-scanner mirror for two-dimensional deflection of light), it usually is not possible to realize all spring elements with the same dimensions, e.g. the same widths. Thus, spring elements with different sensitivities result. A global fabrication variation then leads to different relative variations of the resonance frequencies, and hence to a variation of the frequency ratio.

A typical 2D scanner, as it is for example illustrated in FIG. 2A, for example comprises inner spring portions 130, 132 with a width of b2=16 μm, and outer spring portions 180, 182 with a width of b1=2 μm.

Thus, a ratio of the widths or sensitivities results as follows:

$$\frac{b_1}{b_2} = 0.125 \approx \frac{S_{rel2}}{S_{rel1}} \text{ or } \frac{b_2}{b_1} = 8 \approx \frac{S_{rel1}}{S_{rel2}} \tag{14}$$

If the spring geometry is structured additionally, for example, through trenches 140, 142 in FIGS. 1A, 1C or 2A along the torsion axis, the overall length of the structured edges increases, and hence the sensitivity to fabrication variations. By variation of the length, number, arrangement and shape of these slots or trenches, the sensitivity of a spring structure or a spring portion may thus be increased arbitrarily. Hence, it is possible to tune all spring elements or spring portions employed in a device in their sensitivities with respect to each other. The change of the spring hardness caused by the additional structuring may here be taken into account in the dimensioning of the spring geometry to achieve optimum adaptation of the sensitivity.

In one embodiment for a two-dimensional micromirror, spring portion widths of $b_1$=12 μm and $b_2$=25 μm were used, that is a ratio of the spring portion widths of:

$$V_b = \frac{b_2}{b_1} = \frac{25 \text{ μm}}{12 \text{ μm}} = 2.1 \tag{15}$$

According to relation (3), this corresponds to a frequency ratio $V_f$ of:

$$V_f = \frac{f_2}{f_1} \approx \frac{b_1^{3/2}}{b_2^{3/2}}. \tag{16}$$

In this embodiment, by corresponding trenches in the spring portions with the width of $b_1$, the ratio of the relative sensitivities could be improved to almost 1, i.e.:

$$\frac{S_{rel2}}{S_{rel1}} = 1. \tag{17}$$

Without the corresponding trench structures, as set forth beforehand, the ratio Vs of the relative sensitivities or the ratio of the relative frequency changes would also be about 2.1, or 0.48 as the inverse thereof.

For display applications necessitating a large frequency ratio, the ranges for the ratios Vf of the resonance frequencies, and correspondingly the ratios Vb of the spring portion widths, range from 2 to 10, or the inverses thereof range from 0.1 to 0.5. Without trenches, the ratios of the relative sensitivities therefore also lie in these ranges, which leads to deterioration of the actual frequency ratio against the desired frequency ratio, as illustrated before.

Embodiments of the micromechanical devices, apparatuses and/or systems may, however, achieve ratios of the relative sensitivities ranging from 0.8 to 1.2 independently of the frequency ratio by means of corresponding trenches.

In other typical applications of two-dimensional spring elements, for example, the frequency ratios or width ratios range from 0.5 to 0.8 and 1.2 to 2, respectively. In these instances, embodiments with corresponding trench structures may also achieve improvements of the ratios of the relative sensitivities or frequency changes, for example in a range from 0.9 to 1.1.

On the basis of FIGS. 2A and 2B, this will be explained in even greater detail in the following. FIG. 2A shows a micromechanical device formed as a two-dimensional torsion oscillator in which the inner spring portions 130, 132 have a greater width b2 than the two outer spring portions 180, 182 with a width of b1, i.e. b1<b2 applies. At equal length, i.e. l1=l2, the outer spring portions 180, 182 have a smaller spring hardness and also a lower resonance frequency f1 than the inner spring portions 130, 132 with the resonance frequency f2. Moreover, the higher mass moment of inertia reduces the resonance frequency of the outer spring portion. Hence, a two-dimensional micromirror according to FIG. 2A may deflect a modulated light beam in a row direction or horizontal direction and a column direction or vertical direction. Here, in such a two-dimensional micromirror for example operated in line-wise manner, the light beam is deflected along a line or in horizontal direction at the higher resonance frequency f2, and along a column or in vertical direction at the lower frequency f1.

Figure 2B:
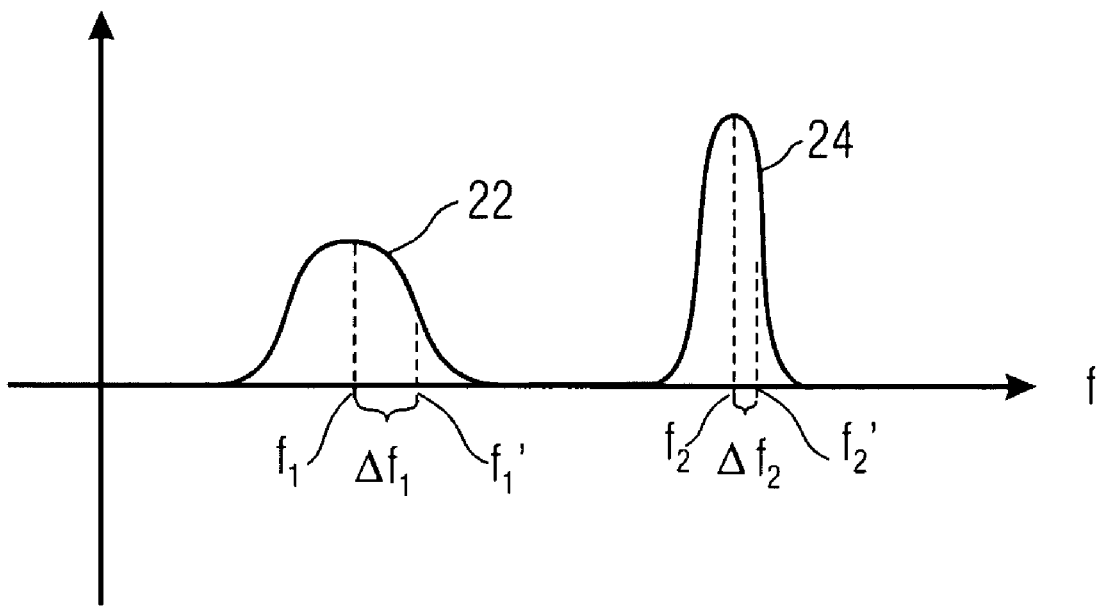
FIG. 2B shows an exemplary frequency distribution of the resonance frequency of two micromechanical devices with and without adaptation of the sensitivities by a trench structure.
Figure 2B:
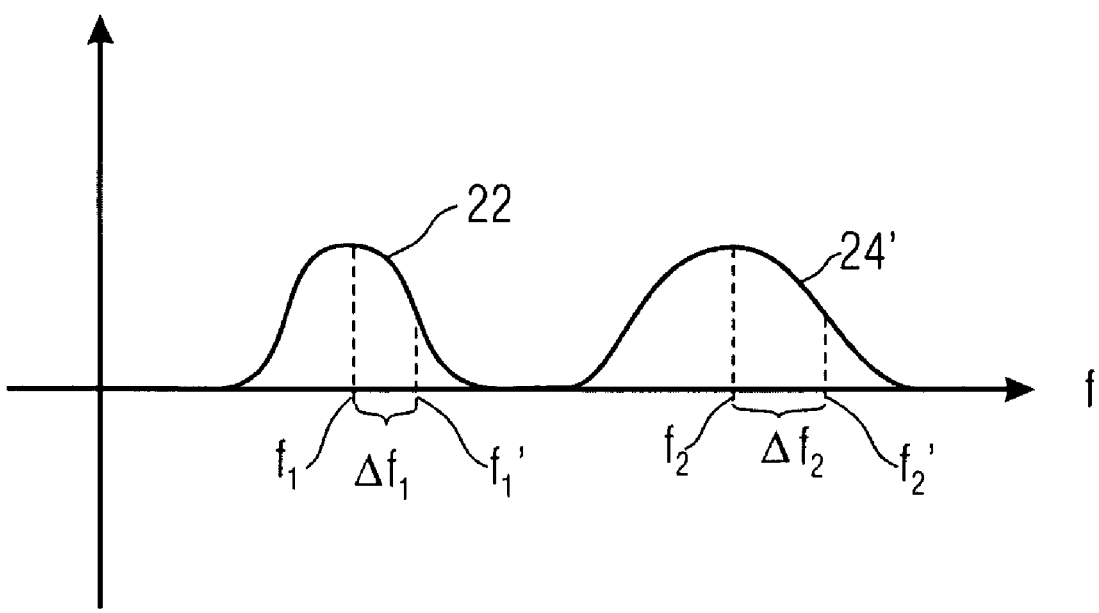

At the top, FIG. 2B shows two exemplary frequency distributions 22 and 24 for the resonance frequency of two spring portions or torsion spring elements without trenches, wherein the frequency is plotted on the x axis, and the incidence is plotted on the y axis. The distribution 122 shows an incidence distribution of the actual resonance frequency f1' of the first torsion spring element resulting due to the fabrication variation at the lower target frequency f1, and the distribution 124 the incidence distribution of the actual frequency f2' of the second torsion spring element resulting due to the movement variations at the higher target frequency f2. Here, the lower target frequency f1 with the corresponding distribution curve 122 for example corresponds to the target frequency of the outer spring portions 180, 182, and the higher target frequency f2 with the corresponding curve 124 to the target frequency of the inner spring portions 130, 132.

As explained before, global, local and direction-dependent variations may influence the geometries or dimensions of the fabricated spring portions. If these variations in the production are the same or substantially the same for all spring portions 130, 132, 180, 182, all spring portions have the same or substantially the same width changes Δb. The same Δb leads to a smaller relative width change, and hence also to a smaller relative frequency change, in the inner spring portions 130, 132 with the greater width b2 and in the outer spring portions 180, 182 with the smaller width b2 and the therefore greater relative width change and corresponding greater relative frequency change. In other words, the actual resonance frequency f1' differs from the target frequency f1 by Δf1 due to the width deviation Δb. Similar things apply for the spring portions with the higher target frequency f2, in which the actual resonance frequency f2' differs from the target frequency f2 by Δf2 due to the fabrication variations. As set forth above, a certain frequency ratio Vf=f2/f1 is to be achieved in the micromirror, i.e. the ratio is to lie in a certain range and have a given value, if possible:

$V_{fmin} \leq V_f' \leq V_{fmax}$ or $V_f' = V_f$ with $V_f' = f_2'/f_1'$ and $V_f = f_2/f_1$ FIG. 1 wherein $V_{fmin}$ is the minimum frequency ratio, $V_{fmax}$ is the maximum frequency ratio, $V_f$ is the target frequency ratio, and $V_f'$ is the actual frequency ratio. The following applies:

$V_f' = f_2'/f_1' = (f_2 + \Delta f_2)/(f_1 + \Delta f_1)$.

Hence, the actual frequency ratio $V_f'$ equals the target frequency ratio $V_f$, only if the relative frequency deviation from the first frequency $f_1$ and the second frequency $f_2$ are equal, i.e.

$\Delta f_2/f_2 = \Delta f_1/f_1$ applies.

As explained above, the same width change Δb causes a greater relative hardness change, and hence a greater relative resonance frequency change, in more sensitive spring portions, i.e. spring portions with smaller width, than in spring portions that are less sensitive. In other words, the relative frequency change of the spring portion with the lower target frequency is greater than the relative frequency change of the spring portion with the higher target frequency, so that the actual frequency ratio Vf' deviates further and further from the target frequency ratio Vf with increasing width change Δb.

Here, the "sensitivity of the spring hardness to the fabrication variations" may also be regarded as the relative change of the spring hardness depending on the fabrication variations.

So as to adapt the sensitivity of the more insensitive spring portions to the sensitivity of the "more sensitive" spring portions, the first is increased by one or more trench structures in the spring portions.

Here, it is assumed that all spring portions are subject to the same fabrication circumstances or influences, and hence have the same width change Δb, both in magnitude and in sign. Here, the trench structures are dimensioned so that all spring portions have the same sensitivity to the fabrication variations, the relative frequency change of the spring portions is the same, and the actual frequency ratio $V_f'$ matches or substantially matches the target frequency ratio $V_f$.

In other words, in contrast to conventional procedures in which it is attempted to minimize the sensitivity of the spring hardness to fabrication variations, that is generate a distribution curve as narrow as possible, embodiments of the micromechanical devices additionally comprise trenches in the spring elements or spring portions, in order to increase the sensitivity of certain spring elements or spring portions.

FIG. 2B shows, at the bottom, exemplary frequency distributions 22 and 24', wherein no trench was formed in the spring portions with the target frequency f1, and the distribution thus corresponds to the distribution 22 in the diagram above. In the spring portions with the target frequency f2, trenches were introduced to adapt the relative sensitivity of the second spring portion or the second spring portion pair to the relative sensitivity of the first spring portion or first spring portion pair, as this is symbolically illustrated by the broadened and flattened distribution curve 24'. In other words, the relative sensitivity of the second spring portion or second spring portion pair was changed so that the following applies:

$$\frac{f_2 + \Delta f_2}{f_1 + \Delta f_1} \approx \frac{f_2}{f_1}. \tag{18}$$

Thus, the embodiment according to FIG. 2A has the trenches 140, 142 only at the inner, less sensitive spring portions 130, 132, in order to tune the sensitivity thereof to the fabrication variations with the sensitivity of the outer, more sensitive spring portions 180, 182, which do not comprise any trenches.

Figure 2C:
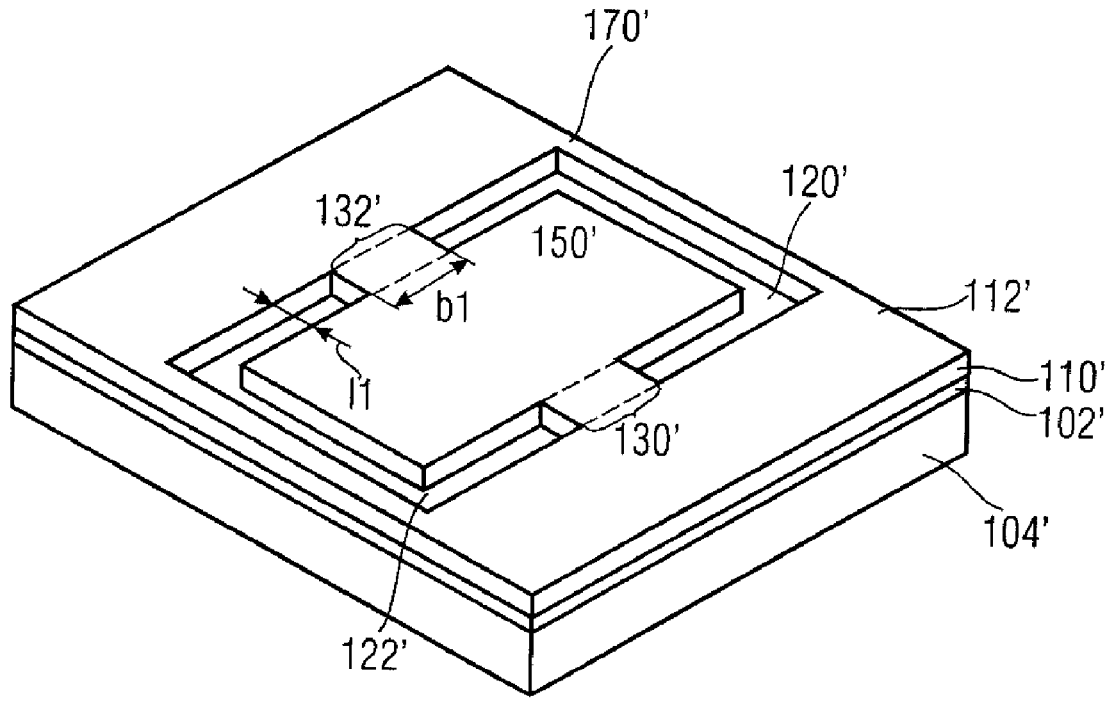
FIG. 2C shows an embodiment of a micromechanical system with a first and a second micromechanical device with torsion springs.
Figure 2C:
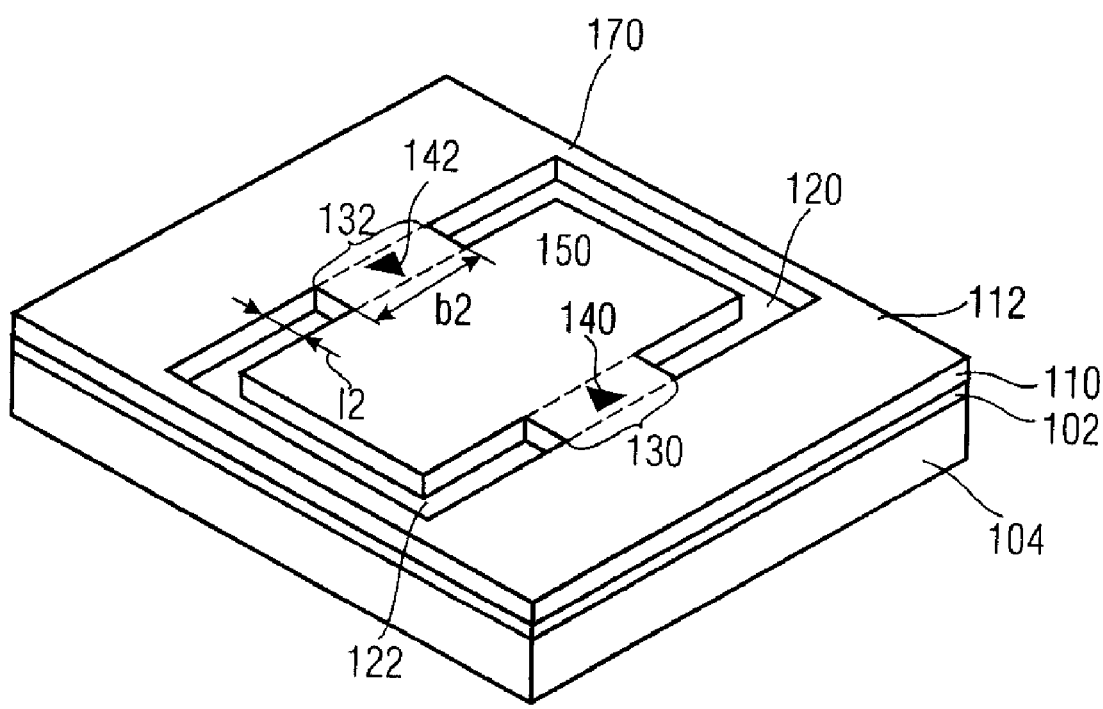
Figure 2D:
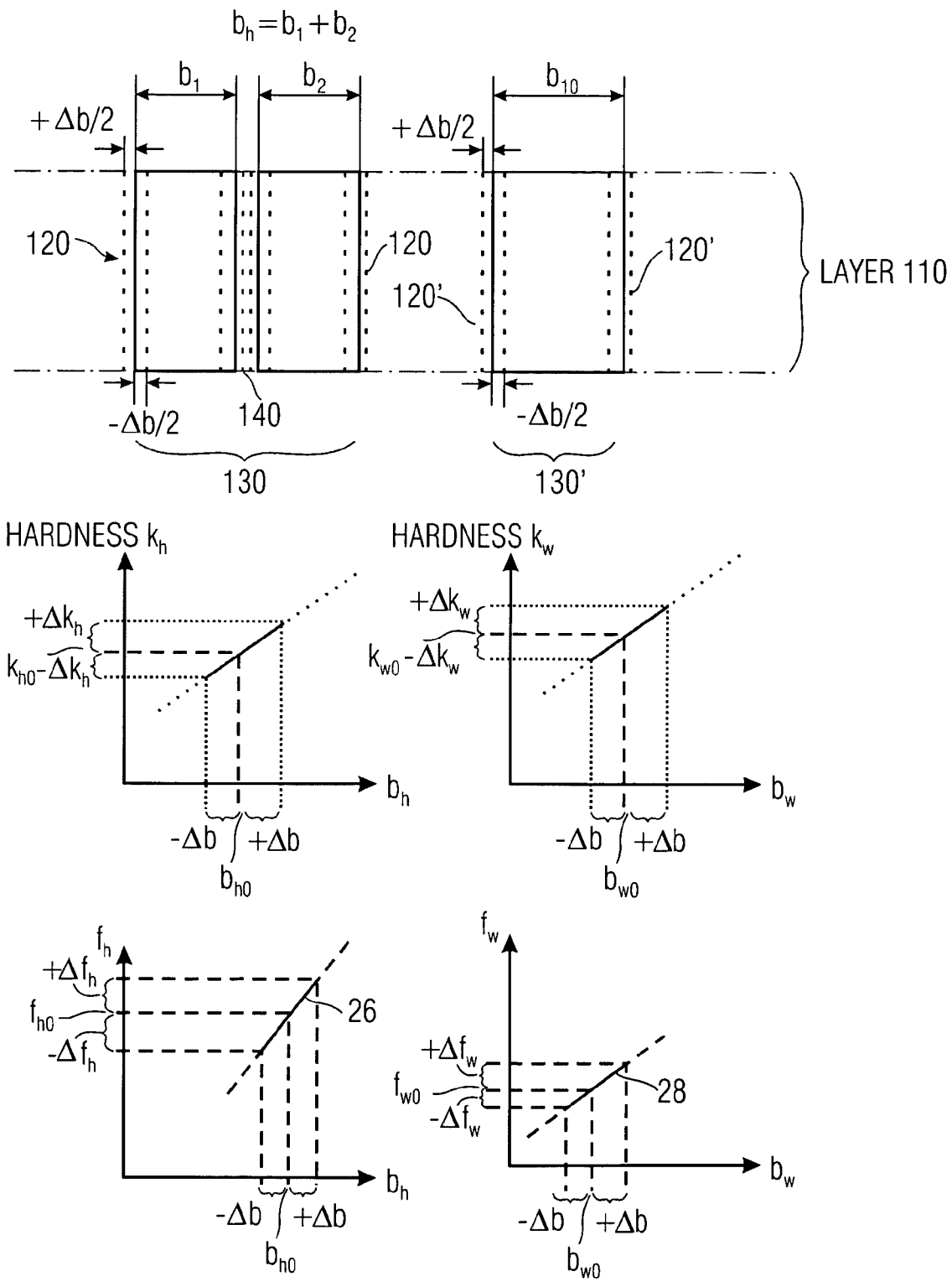
FIG. 2D shows an exemplary adaptation of the sensitivity of a spring portion to a more sensitive spring portion, according to one of the embodiments.

FIG. 2D shows an example of an adaptation of a sensitivity of the spring hardness of a spring portion to another spring portion having higher sensitivity to fabrication variations, in order to maintain a given target ratio of the resonance frequencies of the two spring portions independently of fabrication variations, if possible. One example of two flexion spring elements to be tuned to each other will be described in greater detail later on the basis of FIG. 2E. At the top, FIG. 2D shows an example for a layer 110, in which a first oscillation element (not shown in FIG. 2D, reference numeral 150' in FIG. 2E) oscillatably suspended via the first spring portion 130' of the layer 110 is defined by the slots 120'. Furthermore, FIG. 2D at the top shows slots 120 in the layer 110, in order to oscillatably suspend a second oscillation element (not shown in FIG. 2D, reference numeral 150 in FIG. 2E) via a second spring portion 130, wherein a first trench 140 in a main surface of the layer 110 is formed in the second spring portion 130. The width $b_h$ of the second spring portion 130 is greater than the width $b_w$ of the first spring portion 130'. Thus, the spring hardness $k_h$ of the second spring portion 130 is greater than the spring hardness $k_w$ of the first spring portion 130'. In other words, the second spring portion 130 is harder, and the first spring portion 130' is softer. In the embodiment shown in FIG. 2D, the trench 140 is formed to be continuous, that is it extends, like the slots 120, from one main surface of the layer 110 to the opposite main surface of the layer 110. The first spring portion 130' does not have a trench.

As explained above, due to fabrication variations, there arise deviations of the spring width Δb, which lead to the same absolute changes Δb of the spring width in the case of global variations or variations at the slots 120, 120' "global" or similar at least with respect to the two spring portions 130, 130'. Here, +Δb designates an anisotropic lateral material addition, that is a widening of the spring portions, and −Δb an anisotropic lateral material removal or leaning of the spring portions. Here, it is assumed that the thickness of the layer 110 is constant and equal for both spring portions 130, 130'. As shown in FIG. 2D, the fabrication variation in the first spring portion 130' leads to a material removal or addition at the two side faces or minor faces adjoining the slots 120'. In the second spring portion 130 with the slot 140, in which the material removal or addition takes place at the side edges of the slots 120 and of the side edges of the trench 140, an actual width of $b_h = b_1 + b_2 +/- (4*\Delta b/2)$ results therefrom as target width instead of the width $b_h = b_1 + b_2$. The sensitivity of the spring hardness $k_h$ of the harder spring portion 130 has thus been increased by the trench 140.

The central two graphs of FIG. 2D show two exemplary courses of the hardness over the width b of the spring portions. The diagram on the bottom left shows an exemplary course of a hardness $k_h$ (on the y axis) depending on the width $b_h$ (on the x axis). Here, $b_{h0}$ designates the target width of the second spring portion 130, whereas +/−Δb represents the width variations caused by the fabrication variation, as already shown in the upper section of FIG. 2D. A target hardness $k_{h0}$ corresponds to the target width $b_{h0}$. The material removal $-\Delta b$ causes a decrease in the spring hardness $-\Delta k_h$, and a material addition $+\Delta b$ causes an increase in the hardness by $\Delta k_h$, as this is shown on the bottom left in FIG. 2D.

The same correspondingly applies for the first spring portion 130', for which the diagram to the right of the center of FIG. 2D shows an exemplary course of the spring hardness $k_w$ (on the y axis) depending on the width $b_w$ (on the x axis). The target spring strength $k_{w0}$ corresponds to the target width $b_{w0}$, and the material removal $-\Delta b$ causes a reduction $-\Delta k_w$ of the hardness, and a material addition $+\Delta b$ an increase $+\Delta k_w$ of the spring hardness kw of the second spring portion.

As set forth above, the hardness changes $+/-\Delta k_h$ of the harder spring portion and $+/-\Delta k_w$ of the softer spring portion differ from each other at equal width change $+/-\Delta b$.

Here, the course of the graphs, i.e. the dependence of the spring hardness on the width change, may be linear, square, cubic or correspond to other courses. Typically, for a region near the target values, at least a linear approximation of the graph can be determined.

FIG. 2D, in the lower two graphs, shows the dependence of resonance frequency f on the width b. The graph on the bottom left in FIG. 2D shows the frequency $f_w$ (on the y axis) of the second, harder spring portion 130 depending on the width $b_h$ (on the x axis) of the second spring portion. A target frequency $f_{h0}$ corresponds to the target width $b_0$. The material removal $-\Delta b$ causes a resonance frequency change $-\Delta f_h$, and a material addition $+\Delta w$ generates a resonance frequency increase $+\Delta f_h$.

The diagram on the bottom right in FIG. 2D shows a corresponding dependence of the frequency $f_w$ (on the y axis) of the first, softer spring portion 130' depending on the width $b_w$ (on the x axis) of the first spring portion. A target frequency $f_{w0}$ corresponds to the target width $b_{w0}$. A material removal $-\Delta b$ causes a frequency change $-\Delta f_w$, and a material addition $+\Delta b$ causes a resonance frequency change $+\Delta f_w$.

As already set forth on the basis of FIG. 2B, one aspect of the present embodiments concerns reducing the fabrication-induced variation of the frequency ratio $V_f$ of two eigenfrequencies of a device.

Assuming the target frequency ratio to be $V_f = f_{h0}/f_{w0} = 2$, that is the target frequency of the harder or second spring portion 130 or second oscillation element is greater than the target frequency of the softer or first spring portion 130' or first spring portion by a factor of 2, the trench 140 of the harder spring portion 130 is dimensioned, in embodiments of the present invention, so that the corresponding frequency change $\Delta f_h$ of the second oscillation element with the second spring portion 130 by the target value $f_{h0}$, at the same $\Delta b$, is twice as large as the frequency change $\Delta f_w$, resulting from the same width change $\Delta b$, by the target value $f_{w0}$ of the first oscillation element with the softer spring portion 130', i.e. the relative frequency change $\Delta f_h$, $\Delta f_w$ of the two frequencies is the same with respect to their target frequencies $f_h$ and $f_w$, respectively. In other words, the slope of the graph 26, which describes the relationship between the resonance frequency $f_h$ and the width $b_h$, is changed so that it is twice as high at the target value $f_{h0}$ in this example than the slope of the graph 28 at the target value $f_{w0}$, which describes the relationship between the resonance frequency $f_{w0}$ and the width $b_w$.

Figure 2E:
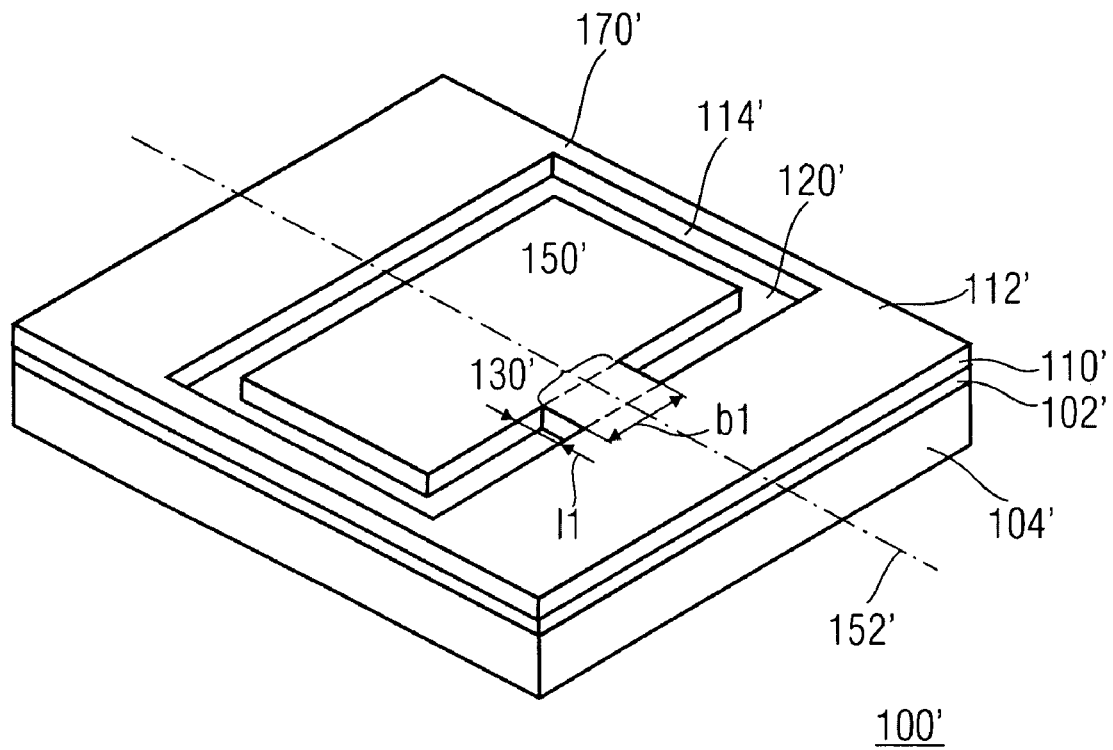
FIG. 2E shows an embodiment of the micromechanical system with a first and a second micromechanical device with flexion springs.
Figure 2E:
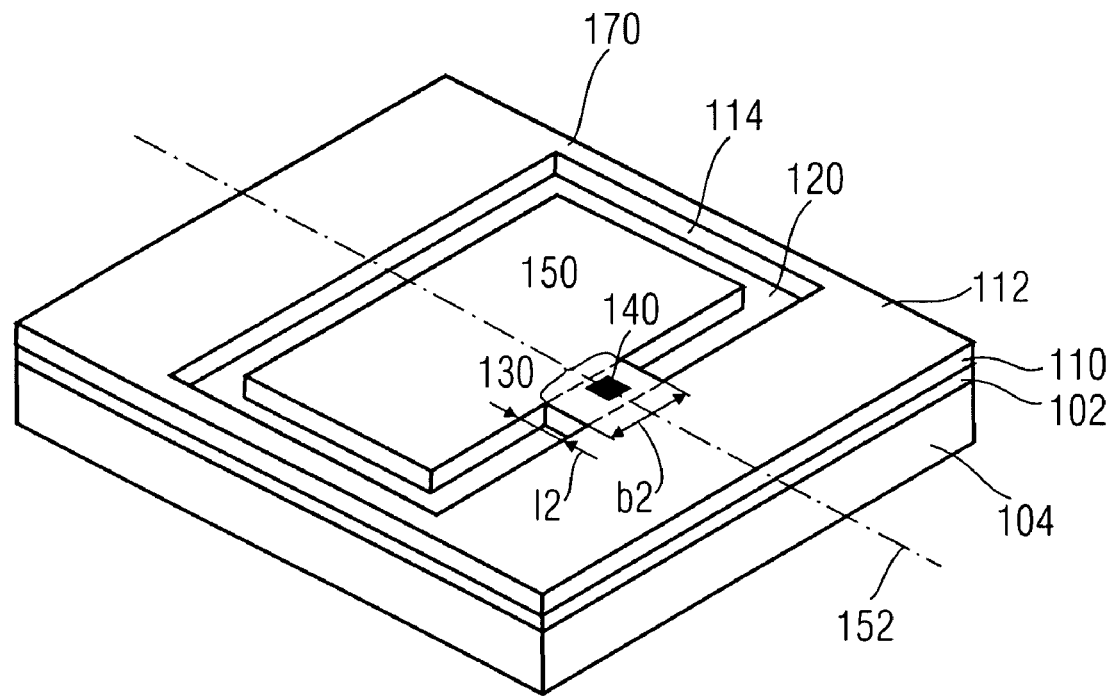

The target frequency and/or resonance frequency of the first and/or second oscillation element are, formulated more specifically, the target and/or resonance frequency of the first and/or second oscillation system, wherein the first oscillation system for example is formed of the first spring portion and the first oscillation element, and the second oscillation system of the second spring portion and the second oscillation element (see embodiment in the FIGS. 2D and 2E). In two-dimensional micromirrors, as illustrated e.g. in FIG. 2A, the first oscillation system is, for example, formed of the outer spring portions 180, 182, the oscillating frame 170" and the second oscillation system, wherein the second oscillation system in this case is formed of the inner spring portions 130, 132 and the oscillation element 150. Alternatively, in the embodiment according to FIG. 2A—according to FIGS. 2C and 2E—the arrangement of the oscillating frame 170", the inner spring portions 130, 132 and the actual oscillation element 150, e.g. a mirror 150, may be referred to as "first" oscillation element, and the actual oscillation element 150 as "second" oscillation element 150.

Here, this adaptation of the frequency sensitivity typically is performed only for a certain range around the working point defined by the target frequency and the target width. The trench 140 thus is chosen so that the relative frequency changes of the harder and of the softer spring portion are as equal as possible in a certain working range around the working point, and/or the absolute changes of the frequencies, and hence the slope of the frequency curves, have a certain ratio around this working point, if possible. This applies independently of the fact whether the spring hardness and/or the frequency depends on the width change in linear, square, cubic or other manner, for example.

In one embodiment according to FIG. 2E, the trench 140 in the second spring portion 130 hence is formed such that a ratio of a relative change of the resonance frequency of the second oscillation element 150 to a relative change of a resonance frequency of the first oscillation element 150' changes from 0.8 to 1.2, and from 0.9 to 1.1 in other embodiments, in the case of an anisotropic lateral material removal $-\Delta b$ and/or an anisotropic lateral material addition $+\Delta b$ of the first and second spring portion 130, 130'.

FIG. 2A only shows one possible embodiment with two resonant degrees of freedom, the inner spring portions 130, 132 may be the more narrow spring portions and comprise the trenches for the adaptation of the sensitivity in alternative embodiments, for example. In yet other embodiments, all four spring portions may have trench structures if this is easier to perform due to layout or fabrication conditions, but still yield resonance frequencies and/or resonance frequency ratios that are acceptable.

FIG. 2C shows an embodiment of a micromechanical system or a micromechanical apparatus with a first micromechanical device 1100' and a second micromechanical device 1100, wherein both devices are one-dimensional torsion oscillators, e.g. micromirrors. Here, the resonance frequencies of the first micromechanical device 1100' and of the second micromechanical device 1100 are to be at a certain frequency ratio and the sensitivities be adapted to each other. Here, the first micromechanical device 1100' for example corresponds to the one according to FIG. 1C, wherein the device 1100', in contrast thereto, does not have a trench structure 140, 142.

In the following, so as to distinguish the first and the second micromechanical device, the corresponding reference numerals for the first micromechanical device are designated with "'", i.e. the reference numeral 130' designates a spring portion and the reference numeral 150' a spring element of the first device.

The second micromechanical device corresponds to the one in FIG. 1C. Analog to the embodiment according to FIG. 2A, $b_2 > b_1$ applies, so that spring portions 130, 132 without the trench structures 140, 142 would have less sensitivity of the spring hardness with respect to fabrication variations, and the sensitivity of the spring hardness of the spring portions 130, 132 would be adapted to the higher sensitivity of the spring portions 130, 132 of the first device 1100' by the trenches or trench structures 140, 142.

FIG. 2E shows a further embodiment of a micromechanical system or a micromechanical apparatus with a first micromechanical device 100' and a second micromechanical device 100. Here, the resonance frequency of the first micromechanical device 100' and the resonance frequency of the second micromechanical device 100 are to be at a certain frequency ratio, and the sensitivities to fabrication variations be adapted. Here, the second micromechanical device 100 for example corresponds to the one in FIG. 1A, and the first micromechanical device 100' also, wherein the latter does not have a trench structure as opposed to the micromechanical device 100.

For distinction of the features of the first micromechanical device from the second micromechanical device, the elements of the first micromechanical device have been supplemented with a "'".

Analog to the embodiment according to 2A, $b_2 > b_1$ applies, so that the spring portion 130 without the trench structure 140 has less sensitivity of the spring hardness to fabrication variations, and the sensitivity of the spring hardness of the spring portion 130 will be adapted to the higher sensitivity of the spring portions 130' of the first device 100' by the trenches or trench structures 140.

What has been said regarding the embodiment according to FIG. 2A applies for the micromechanical systems according to FIGS. 2C and 2E in analog manner.

Here, in the embodiments according to FIGS. 2C and 2E, the embodiments may be produced from one layer 110 or two layers 110, 110' in the production. In the case that both "devices" are produced from one layer 110, they may be left as a single device, in other words regarded as two resonator elements, e.g. torsion spring elements or flexion spring elements, of a device according to FIGS. 2C and 2E, or diced into two separate devices.

Figure 3:
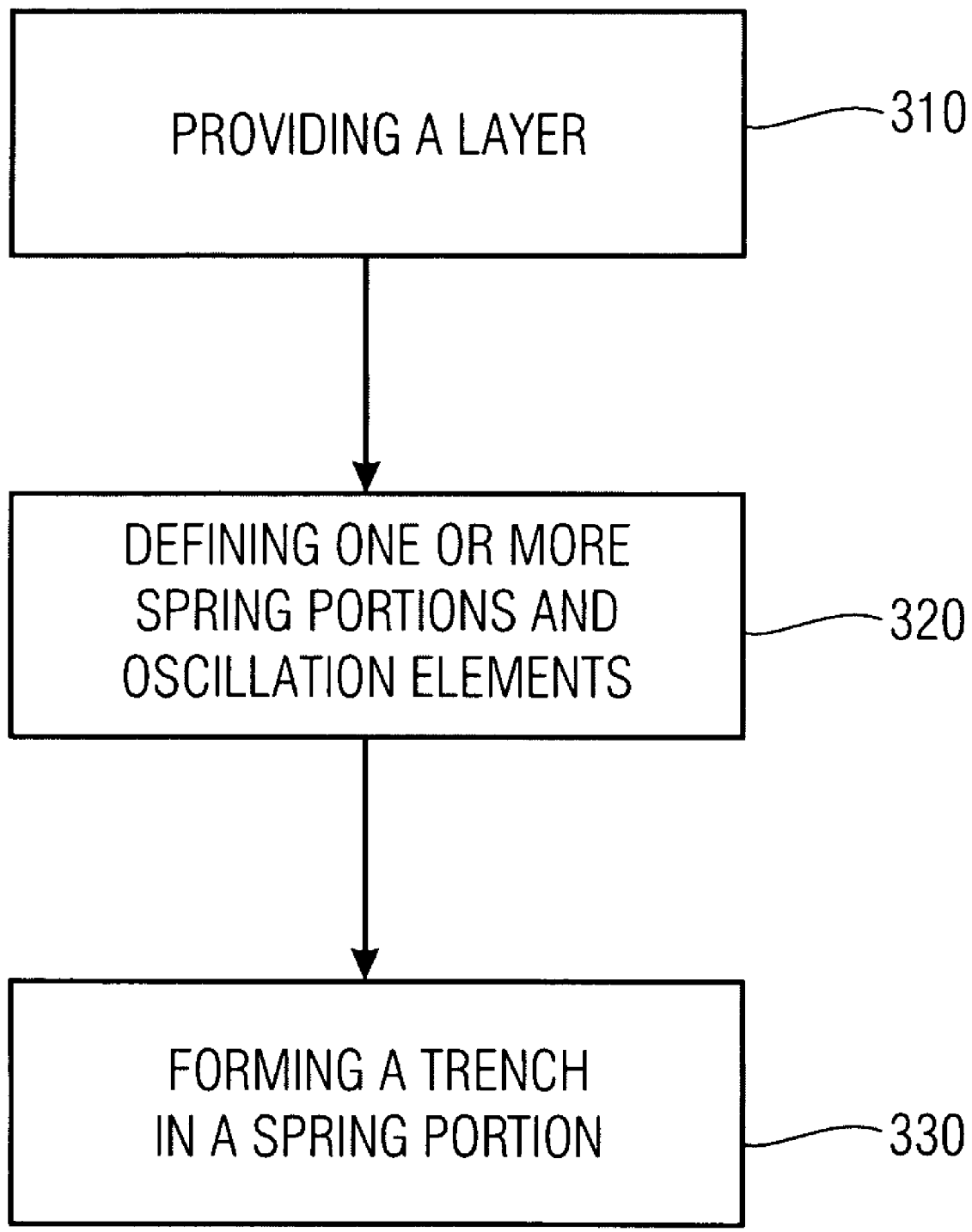
FIG. 3 shows a flowchart of an embodiment of a method for producing a micromechanical device.
Figure 4:
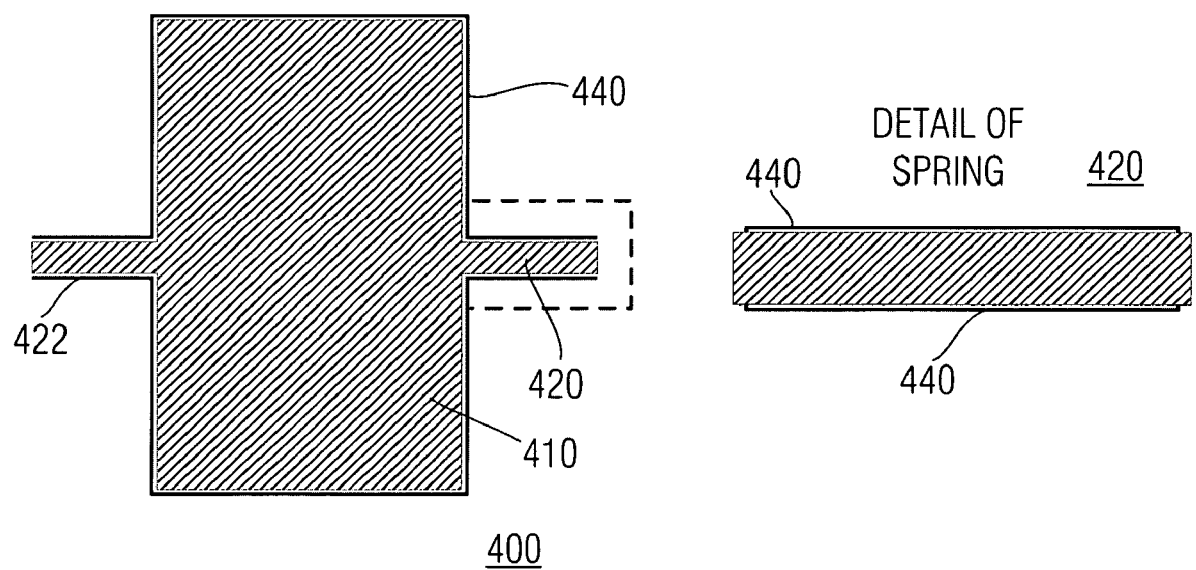
FIG. 4 shows a spring element with a spring portion.

FIG. 3 shows an embodiment of a flowchart of a method for producing a micromechanical device with adapted spring hardness and/or resonance frequency.

In 310, a layer 110 is provided.

In 320, at least one slot 120 is produced in the layer 110, in order to define an oscillation element 150 oscillatably suspended via a spring portion 130 of the layer 110.

In 330, at least one trench 140 is formed in the spring portion 130 in a main surface 112 of the layer 110.

Alternative embodiments of the method comprise the following features.

In 320: producing at least a first slot 120' in the layer 110, in order to define an oscillation element 150 oscillatably suspended via a spring portion 130' of the layer 110, and producing at least a second slot 120 in the layer 110, in order to define an oscillation element 150 oscillatably suspended via a spring portion 130 of the layer 110 (analog to FIG. 2E).

In 330: forming a trench 140 in the second spring portion in a main surface 112 of the layer 110, and forming a trench 140' in the first spring portion 130 in the main surface 112 of the layer 110.

Here, a resonance frequency $f_1$ of the first oscillation element 150' is different from a resonance frequency $f_2$ of the second oscillation element 150, and the first spring portion 130', the second spring portion 130 and the trench 140 are formed such that, with an anisotropic lateral material removal $-\Delta b$ or an anisotropic lateral material addition $+\Delta b$ of the first spring portion 130' and the second spring portion 130, a ratio $V_s$ of a relative change of the resonance frequency of the second oscillation element 150 to a relative change of the resonance frequency of the first oscillation element 150' ranges from 0.8 to 1.2.

In further embodiments, the resonance frequency $f_1$ of the first oscillation element 150' is smaller than the resonance frequency $f_2$ of the second oscillation element 150.

In further embodiments, the method for example serves for producing a micromechanical system according to FIG. 2C or a two-dimensional micromirror according to FIG. 2A.

As illustrated in FIG. 3, the method may be performed in three successive steps.

In alternative embodiments, 320 and 330 may, however, be performed concurrently in one method step, for example by etching with the same or a different dosage, in order to produce the slot or slots 120, 120' and the trenches 140, 142 in one method step, wherein the trenches 140, 142 and the slot 120 are continuous in the case of an equally high dosage, and the trenches 140, 142 for example are not continuous at different dosage, but have only a certain depth depending on the dosage.

The previously explained production of the slots and the additional trenches does not only have the advantage that one working step is saved, but also ensures that at least global variations of the process have the same influence on the formation of the slots and trenches of all parts of a micromechanical device or all micromechanical devices for example supposed to work in a system in a certain frequency ratio.

In a further embodiment of the method, defining a field portion and an oscillation element by the slot in the layer 110 may also take place after forming 330 the trench in the "future" spring portion.

In a further embodiment, for example, prior to the production, a trench structure 140 is designed or "laid out" with respect to its length, width, depth and arrangement or position on the spring portion so that the sensitivity of the spring hardness to fabrication variations has a given sensitivity as equal as possible for a fabrication variation range as wide as possible, that is for a thickness change range as large as possible.

In methods for producing a micromechanical device according to FIG. 2A or a micromechanical system according to FIGS. 2C or 2E, the above-mentioned "given sensitivity", which is to be achieved by the trench structure, is determined by the sensitivity of the spring hardness to fabrication variations of another more sensitive spring portion, for example, so as to achieve a given frequency ratio of the resonance frequencies of the two spring portions.

In a further embodiment of the method, at first a micromechanical device without trench structure is produced, the spring hardness and/or the actual resonance frequency is determined (see 310, 320), and then a trench is formed afterwards into the spring portion or portions e.g. by etching in order to adapt the spring hardness and/or the resonance frequency to a target frequency or adapt same so that a resonance frequency ratio with another spring portion of the same or another micromechanical device is achieved.

One embodiment further is an apparatus for designing (layout) a micromechanical device or an apparatus for adjusting sensitivity of a micromechanical device, in order to design the trench structure or trench structures as explained above. An embodiment of an apparatus for designing a micromechanical device comprises: a means for designing or receiving design data of a micromechanical device without additional trench structures; a means for defining a sensitivity of a spring hardness of a spring element of the micromechanical device; and a means for determining a structure and arrangement of a trench or a multiplicity of trenches formed in the production of the micromechanical device in the spring portion of the micromechanical device on a main surface of the layer in order to achieve a defined or given sensitivity of the spring hardness.

Here, the means for determining a structure and arrangement of a trench may be formed to determine, based on statistical models of the fabrication variations, the layer material parameters, the method parameters (see reasons for the global, local or direction-dependent variations and the effects thereof), an optimum structure and arrangement of a trench to be produced, or generally a trench structure to be produced of several trenches in the spring portions, from a library of trenches with corresponding structure and arrangement information.

In summary, it may be stated that fabrication variations depending on the spring geometry to be fabricated have an influence on the relative variations of the spring hardness, and hence on the relative variation of the oscillation frequency of the device. One embodiment of the invention is a layout of a micromechanical spring element with additional structuring. This structuring influences the sensitivity of the spring hardness to fabrication variations. Then, it is possible to realize spring elements with various hardnesses, but comparable sensitivity to fabrication variations. The devices fitted therewith indeed still have variations of the oscillation frequencies, but the variation of the frequency ratio of two eigenfrequencies of a device may be reduced substantially.

Furthermore, embodiments concern an apparatus and a method for reducing deviations of the frequency ratios in devices with at least two resonantly used degrees of freedom, wherein a geometrical arrangement of, for example, etched trenches in spring elements is used for targeted adjustments and/or adjustments of the sensitivity to fabrication variations. Hence, this may also be referred to as "sensitivity tuning". Here, good results are achieved especially if the litho or etching variations are same at least on one chip, that is e.g. a micromechanical device, or the two or more chips to be tuned with respect to each other (see FIG. 2C). Local variations, which only extend across even smaller areas, that is variations on the same chip, for example, cannot be balanced.

As explained above on the basis of the embodiments, apart from torsion oscillators, for example also translatory oscillators may be compensated, wherein the embodiments generally relate to micromechanical devices. In other words, embodiments relate to the integration of trenches or trench structures for tuning the sensitivity in resonant Microsystems, e.g. two-dimensional torsion oscillators, such as a 2D micromirror or in an oscillating system with several masses and/or modes, for reducing deviations of the frequency ratio induced by fabrication variations. In further embodiments analog to FIGS. 2A and 2C, various spring portions or spring portion pairs or oscillation elements (see FIG. 2C) may therefore have various masses and/or modes, and the resonance frequencies be tuned with respect to each other.

Even if embodiments of the present invention were above all explained on the basis of section and torsion spring elements, this is not to be construed as a limitation.

Possible applications consist in the realization of Microsystems for a) data capture, e.g. 2D scanners, microscopy etc., b) data output: laser displays, laser printers, laser illuminators, etc., c) beam path manipulation: Fourier spectrometers, path length modulation, etc., and for d) pressure, acceleration, viscosity sensors.

Here, embodiments such as shown in FIGS. 1C, 2A, 2C and 2E, may be chosen so that opposite trench structures or trench structures of opposite spring portions are arranged symmetrically with respect to a central axis of the spring element, which is orthogonal to an axis of the spring element defined by the two opposite spring portions, in order to achieve uniform change in sensitivity on both spring portions, i.e. the first and second spring portions 130, 132 and the first trench structure 140 and the second trench structures 142 are arranged e.g. symmetrically to the axis 154, see FIG. 1C.

In alternative embodiments, the spring portions of various spring elements, which are to be at a certain frequency ratio with respect to each other, may be of different length, and/or the spring elements themselves may for example have a different mass, so that the frequency ratio is determined not only by the width of the spring portions, but also by their length and/or masses and/or mass moments of inertia of the spring portions and spring elements. In these cases, corresponding trench structures may also be used to adapt the sensitivities to fabrication variations, in order to be able to produce micromechanical devices meeting a given resonance frequency ratio, in spite of the fabrication variations.

Depending on the conditions, the embodiments of the inventive method may be implemented in hardware or in software. The implementation may be on a digital storage medium, in particular a floppy disc, CD or DVD with electronically readable control signals cooperating with a programmable computer system so that one of the embodiments of the inventive methods is performed. In general, the embodiments of the present invention thus also consist in software program products or computer program products or program products with program code stored on a machine-readable carrier for performing one of the embodiments of the inventive methods, when one of the software program products is executed on a computer or on a processor. In other words, an embodiment of the present invention may thus be realized as a computer program or software program or program with a program code for performing an embodiment of an inventive method, when the program is executed on a processor.

The processor may here be formed by a computer, a chip card, a digital signal processor or another integrated circuit.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A micromechanical device comprising:
a layer;
at least a first slot formed in the layer to define a first oscillation element oscillatably suspended via a first spring portion of the layer; and
at least a second slot formed in the layer to define a second oscillation element oscillatably suspended via a second spring portion of the layer, wherein a trench is formed in the second spring portion in a main surface of the layer,
wherein a resonance frequency of the first oscillation element is different from a resonance frequency of the second oscillation element, and the first spring portion, the second spring portion and the trench are formed such that, in an anisotropic lateral material removal and/or an anisotropic lateral material addition of the first spring portion and the second spring portion, a ratio of a relative change of the resonance frequency of the second oscillation element to a relative change of the resonance frequency of the first oscillation element ranges from 0.8 to 1.2.

2. The micromechanical device according to claim 1, wherein the resonance frequency of the first oscillation element is smaller than the resonance frequency of the second oscillation element.

3. The micromechanical device according to claim 1, wherein a ratio of the resonance frequency of the second oscillation element to the resonance frequency of the first oscillation element lies outside a range from 0.5 to 2.

4. The micromechanical device according to claim 1, wherein a ratio of the resonance frequency of the second oscillation element to the resonance frequency of the first oscillation element lies outside a range from 0.8 to 1.2, and the ratio of the relative change of the resonance frequency of the second oscillation element to a relative change of the resonance frequency of the second oscillation element to a relative change of the resonance frequency of the first oscillation element ranges from 0.9 to 1.1.

5. The micromechanical device according to claim 1, wherein the trench comprises a straight, curved or meander-shaped structuring.

6. The micromechanical device according to claim 1, wherein the trench is formed at least partially continuously from the main surface to a second main surface opposite the main surface.

7. The micromechanical device according to claim 1, wherein a multiplicity of trenches is formed in the spring portion in the main surface of the layer.

8. The micromechanical device according to claim 7, wherein at least part of the multiplicity of trenches is arranged in parallel with respect to each other.

9. The micromechanical device according to claim 8, wherein at least part of the multiplicity of trenches is arranged behind each other in a line.

10. The micromechanical device according to claim 1, wherein a further slot is formed in the layer next to the second slot, in order to define, together with the second slot, a further spring portion arranged opposite to the second spring portion and the oscillation element of the layer, wherein the oscillation element is oscillatably suspended via the second and the further spring portion, and a further trench is formed in the further spring portion in the main surface of the layer.

11. The micromechanical device according to claim 10, wherein the trench and the further trench are arranged symmetrically to a central axis of the oscillation element, wherein the central axis is orthogonal to a central axis of the oscillation element defined by the trenches.

12. A micromechanical device comprising a layer, in which at least two outer slots are formed to define a first oscillation system with an oscillating frame oscillatably suspended via a first outer spring portion and a second outer spring portion of the layer, and wherein at least two inner slots are formed in the layer within the oscillating frame, in order to define a second oscillation system with an oscillation element oscillatably suspended via two inner spring portions of the layer, wherein a resonance frequency of the first oscillation system is different from a resonance frequency of the second oscillation system, wherein a trench each is formed in a main surface of the layer in a pair of the spring portions, and wherein the inner spring portions, the outer spring portions and the trenches are formed such that, in an anisotropic lateral material removal and/or an anisotropic lateral material addition of the inner spring portions and the outer spring portions, a ratio of a relative change of the resonance frequency of the second oscillation system to a relative change of the resonance frequency of the first oscillation system ranges from 0.8 to 1.2.

13. The micromechanical device according to claim 12, wherein the resonance frequency of the first oscillation system is smaller than the resonance frequency of the second oscillation system, and the trenches are formed in the inner spring portions.

14. The micromechanical device according to claim 12, wherein the two inner spring portions lie on a first central axis of the oscillation element, and the two outer spring portions are arranged on a second central axis of the oscillation element, which is orthogonal to the first central axis.

15. A micromechanical system, comprising
a first micromechanical device comprising
a layer in which at least one slot is formed to define an oscillation element oscillatably suspended via a spring portion of the layer; and
a second micromechanical device comprising
a layer in which at least a second slot is formed to define a second oscillation element oscillatably suspended via a second spring portion of the layer, wherein a trench is formed in a main surface of the layer in the second spring portion;
wherein a resonance frequency of the first oscillation element is different from a resonance frequency of the second oscillation element, and the first spring portion, the second spring portion and the trench are formed such that, in an anisotropic lateral material removal and/or an anisotropic lateral material addition of the first spring portion and the second spring portion, a ratio of a relative change of the resonance frequency of the second oscillation element to a relative change of the resonance frequency of the first oscillation element ranges from 0.8 to 1.2.

16. The micromechanical system according to claim 15, wherein the resonance frequency of the first oscillation element is smaller than the resonance frequency of the second oscillation element.

17. The micromechanical system according to claim 15, wherein, in the second micromechanical device, a further slot is formed in the layer apart from the second slot, in order to define, together with the second slot, a further spring portion arranged opposite to the second spring portion and the oscillation element, wherein the oscillation element is oscillatably suspended via the two spring portions, and a further trench is formed in the main surface of the layer in the further spring portion.

18. The micromechanical device according to claim 1, wherein the trench is formed in the form of a depression in the spring portion in the main surface of the layer.

19. The micromechanical device according to claim 1, wherein the trench is formed in the spring portion in the main surface of the layer, and wherein the trench is shorter than a length of the spring portion.

20. The micromechanical device according to claim 1, wherein the first spring portion, the second spring portion and the trench are formed such that, in the anisotropic lateral material removal and/or the anisotropic lateral material addition of the first spring portion and the second spring portion, the ratio of the relative change of the resonance frequency of the second oscillation element to the relative change of the resonance frequency of the first oscillation element ranges from 0.8 to 1.2 in case the anisotropic lateral material removal and/or the anisotropic lateral material addition is the same for all spring portions, both in magnitude and in sign.

21. A method for producing a micromechanical device comprising:
- providing a layer;
- producing at least a first slot in the layer to define an oscillation element oscillatably suspended via a spring portion of the layer; and
- producing at least a second slot in the layer to define an oscillation element oscillatably suspended via a spring portion of the layer; and
- forming a trench in the second spring portion in a main surface of the layer,
- wherein a resonance frequency of the first oscillation element is different from a resonance frequency of the second oscillation element, and the first spring portion, the second spring portion and the trench are formed such that, in an anisotropic lateral material removal and/or an anisotropic lateral material addition of the first spring portion and the second spring portion, a ratio of a relative change of the resonance frequency of the second oscillation element to a relative change of the resonance frequency of the first oscillation element ranges from 0.8 to 1.2.

22. The method according to claim 21, wherein the resonance frequency of the first oscillation element is smaller than a resonance frequency of the second oscillation element.

23. The method for producing according to claim 21, wherein producing the at least one first slot, producing the at least one second slot, and forming the trench in the at least second spring portion take place in one fabrication step.

24. The method for producing according to claim 21, wherein the fabrication conditions are the same at least when producing the at least one first slot, producing the at least one second slot, and forming the trench in the at least second spring portion.

* * * * *